United States Patent [19]
Lilienthal et al.

[11] 3,780,423
[45] Dec. 25, 1973

[54] TOOL CHANGER

[75] Inventors: Alfred J. Lilienthal, Bourbonnais, Ill.; Theodore F. Johnson; William E. Petri, Jr.; Charles E. Gilbert, Jr., all of Cincinnati, Ohio

[73] Assignee: Cincinnati Gilbert Machine Tool Co., Cincinnati, Ohio

[22] Filed: July 15, 1970

[21] Appl. No.: 54,896

[52] U.S. Cl. ............................. 29/568, 214/1 BB
[51] Int. Cl. ........................................ B23q 3/157
[58] Field of Search ................. 29/568; 214/1 BB, 214/1 BT

[56] References Cited
UNITED STATES PATENTS

| | | | |
|---|---|---|---|
| 3,355,798 | 12/1967 | Drechsler | 29/568 |
| R25,737 | 3/1965 | Brainard et al. | 29/568 |
| 3,412,459 | 11/1968 | Hollis | 29/568 |
| 3,545,075 | 12/1970 | Ollearo | 29/568 |
| 3,256,600 | 6/1966 | Swanson et al. | 29/568 |
| 3,451,125 | 6/1969 | Lehmkuhl | 29/568 |
| 3,188,736 | 6/1965 | Brainard et al. | 29/568 |
| 3,266,141 | 8/1966 | Jacobson et al. | 29/568 |
| 3,613,225 | 10/1971 | Sato et al. | 29/568 |
| 3,647,090 | 3/1972 | Suzuki et al. | 29/568 X |

FOREIGN PATENTS OR APPLICATIONS

| | | | |
|---|---|---|---|
| 902,069 | 7/1962 | Great Britain | 29/568 |

Primary Examiner—Andrew R. Juhasz
Assistant Examiner—Z. R. Bilinsky
Attorney—Wood, Herron and Evans

[57] ABSTRACT

An automatic tool changer for use on a machine tool which moves tools in combinations of rectilinear movements between a spindle at a machine head and a rectangular array of compartments, parallel to the spindle axis, at a storage magazine. The storage magazine is mounted on the support of the machine tool to move in unison with the machine head, and includes a plurality of drawers which move at right angles to a pair of tool forks for transferring tools to and from the forks. The forks are independently linearly movable on a carriage which moves between the storage magazine and the machine head. One tool fork carries tools exclusively from the magazine to the spindle, and the other tool fork carries tools exclusively from the spindle to the magazine. The entire tool changer is movable relative to the machine head to insert tools into and withdraw tools from the spindle.

72 Claims, 41 Drawing Figures

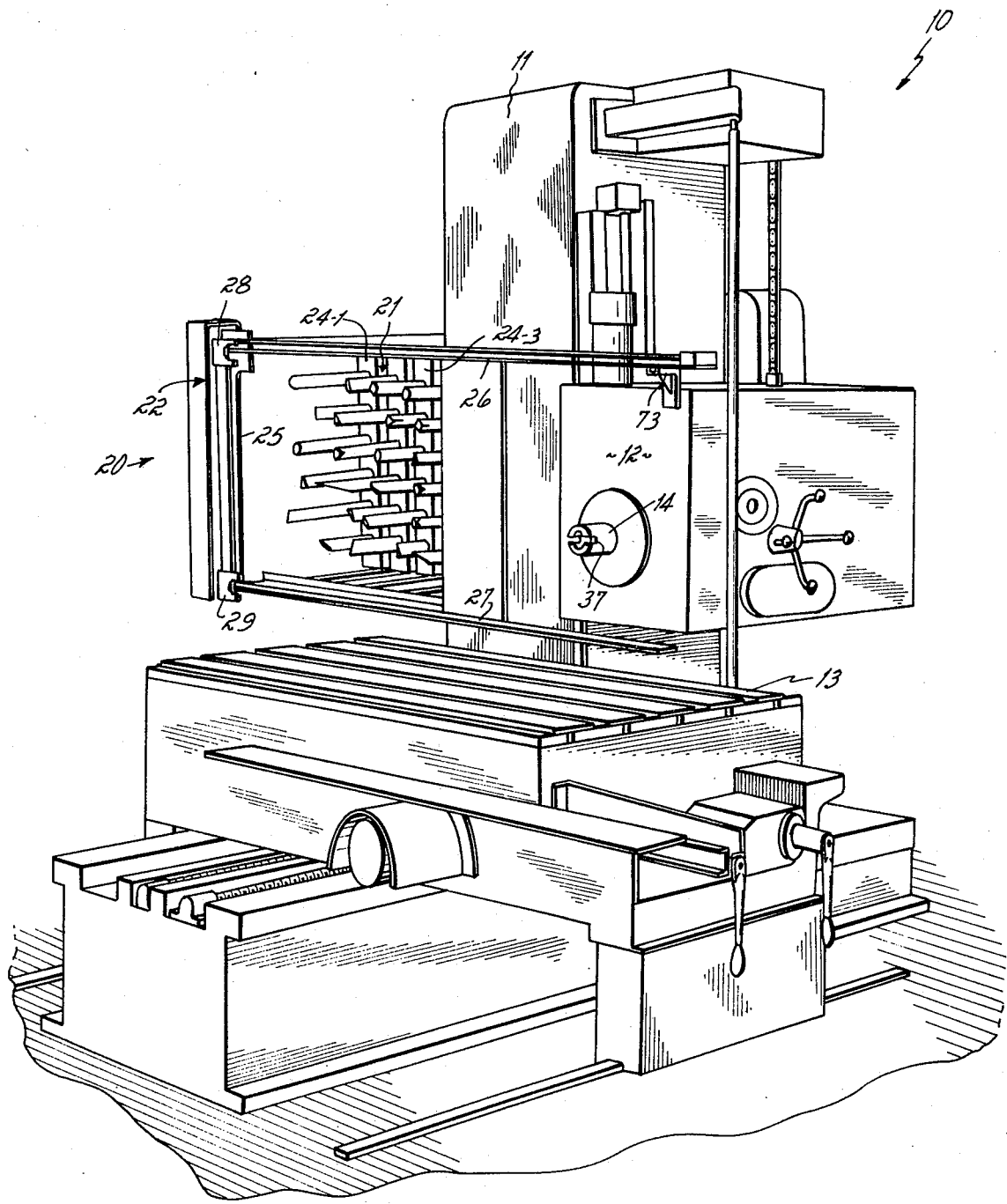

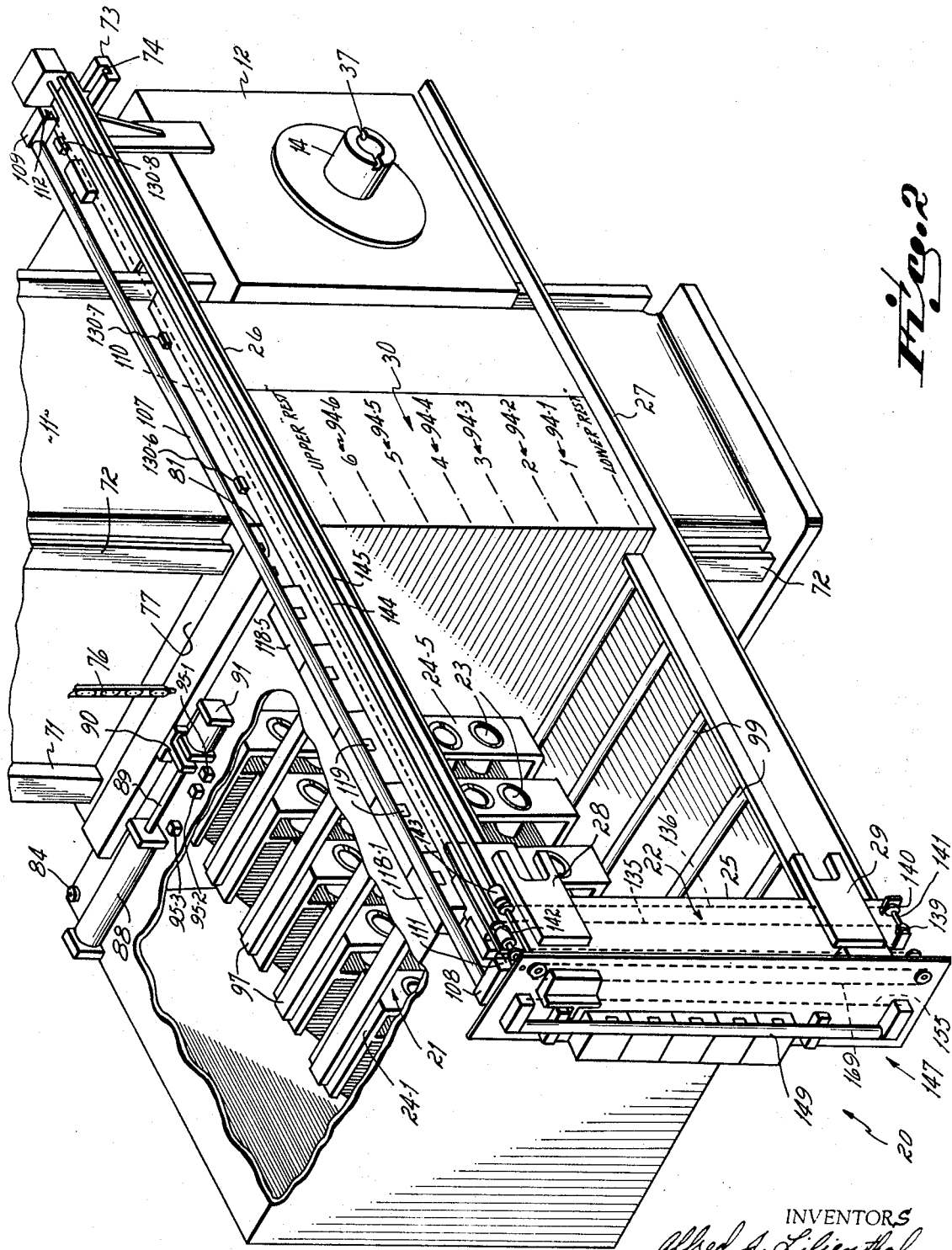

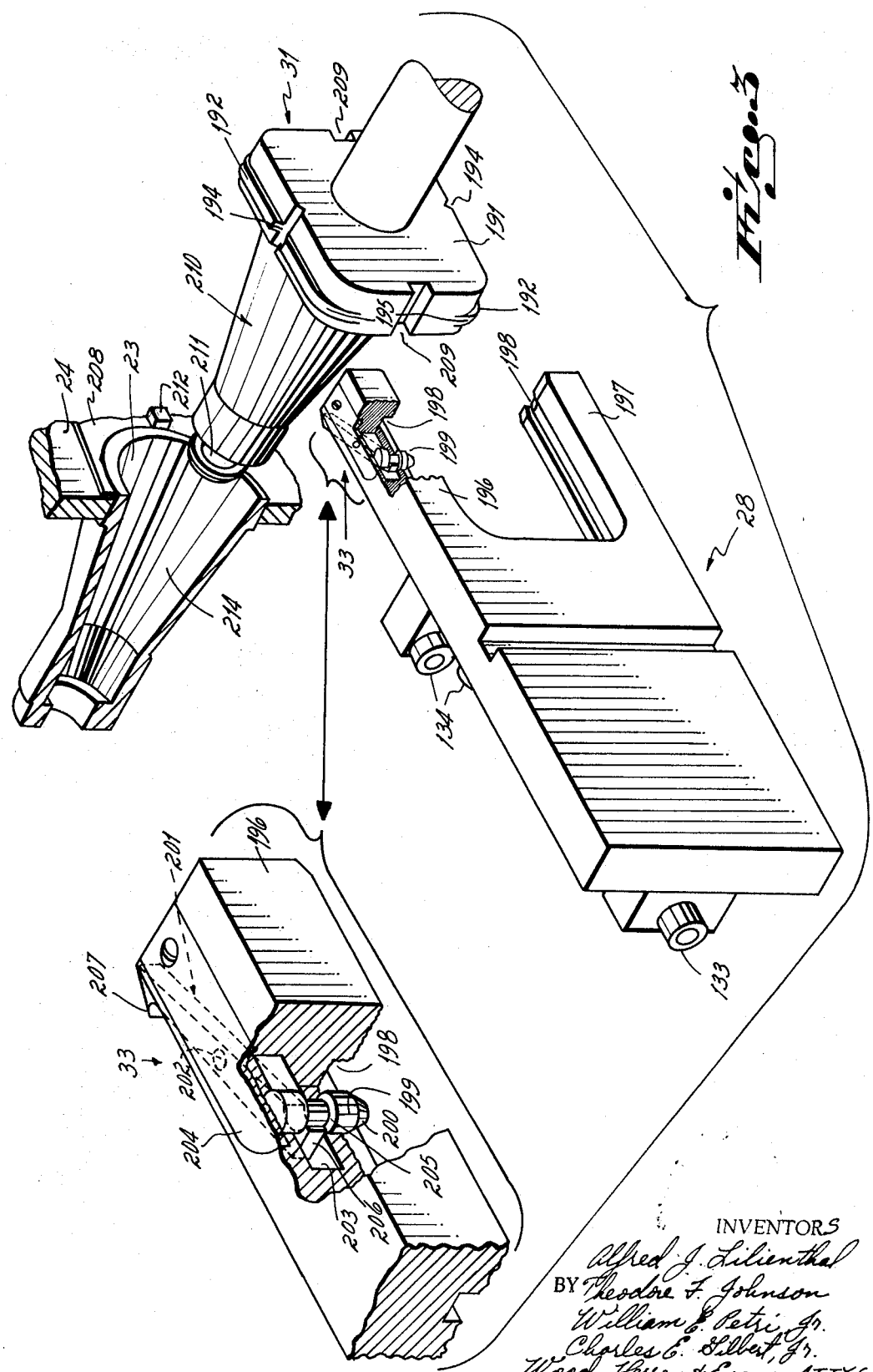

INVENTORS
Alfred J. Lilienthal
BY Theodore F. Johnson
William C. Petri, Jr.
Charles E. Gilbert, Jr.
Wood Herron & Evans ATTYS

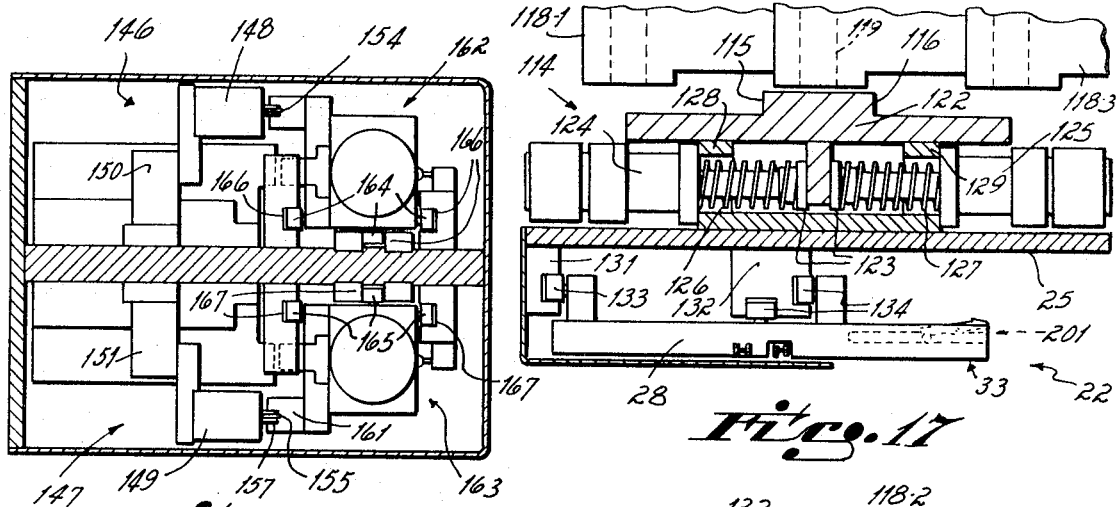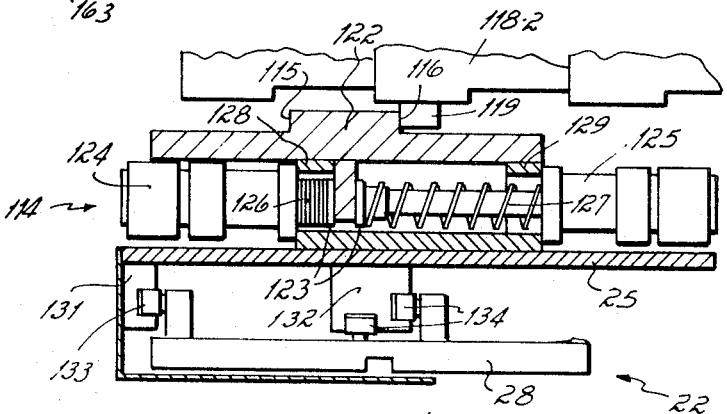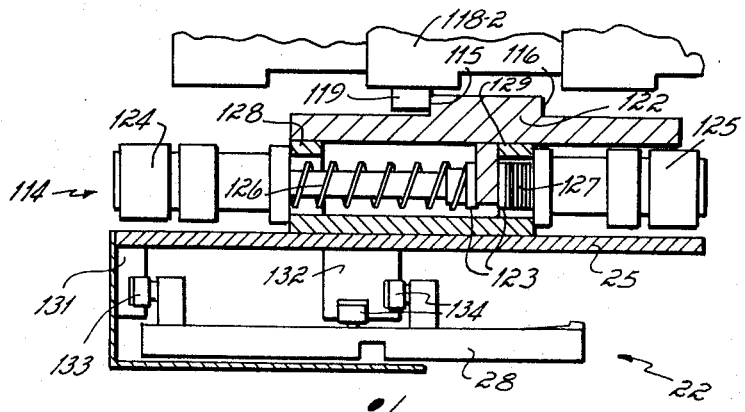

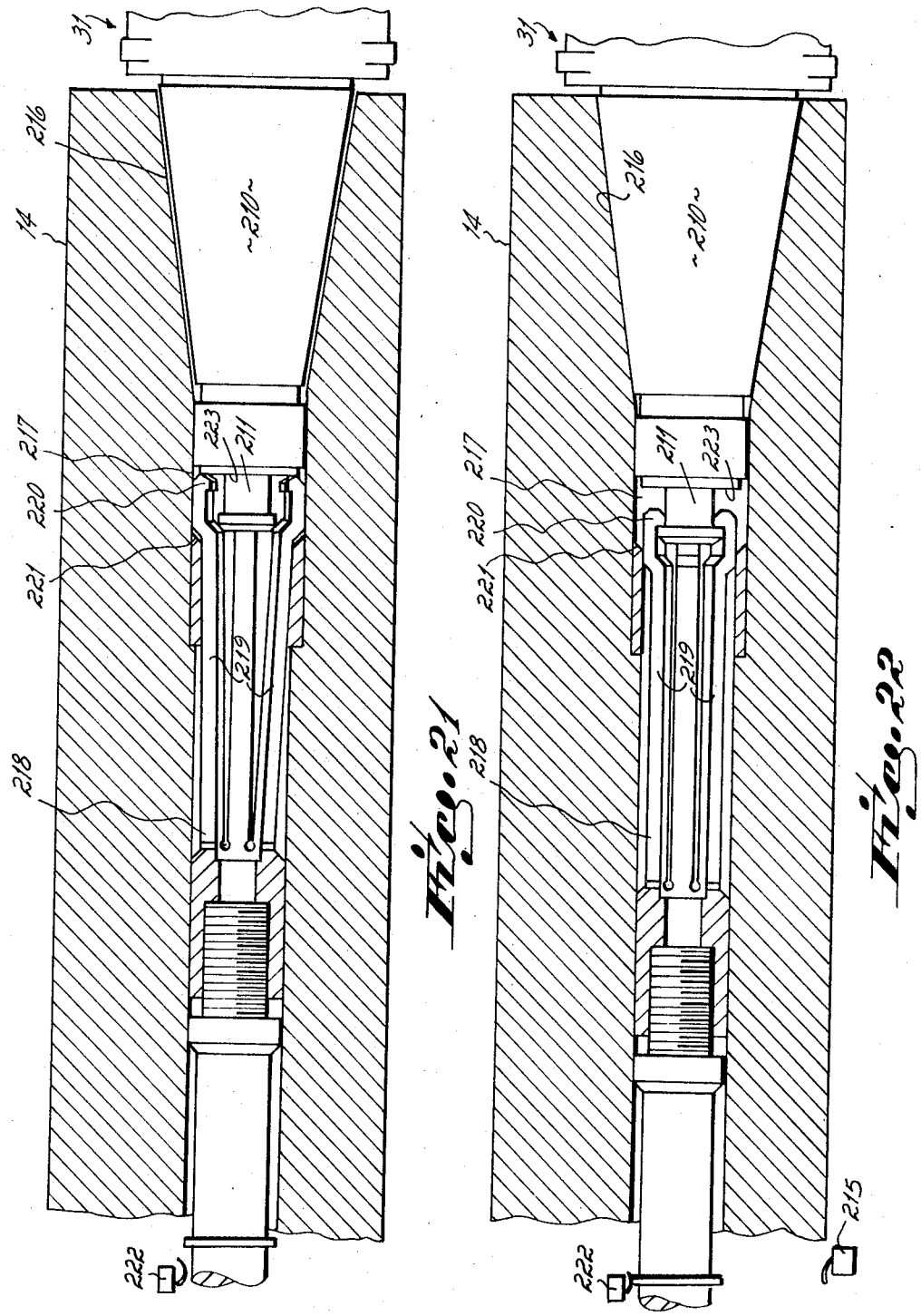

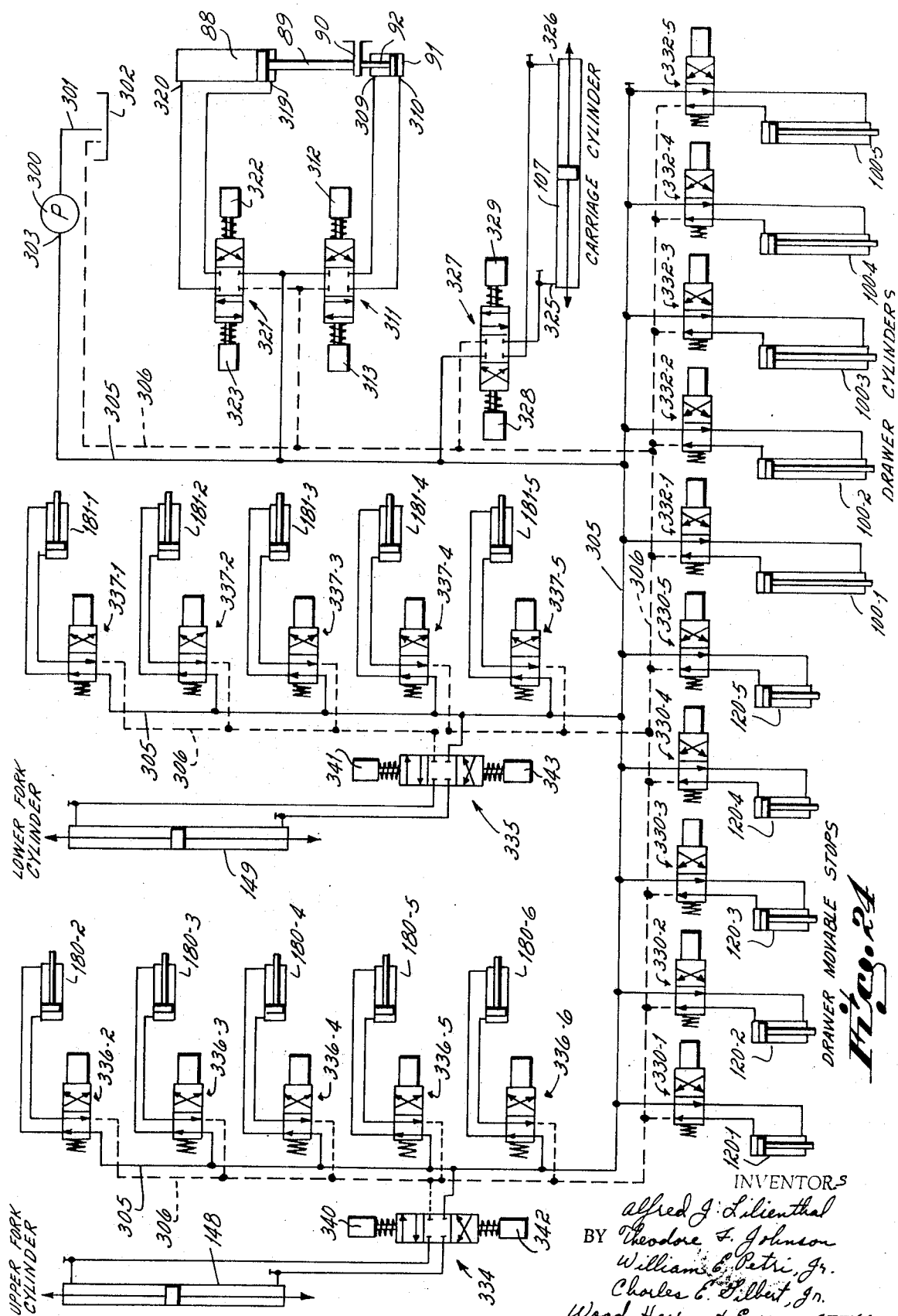

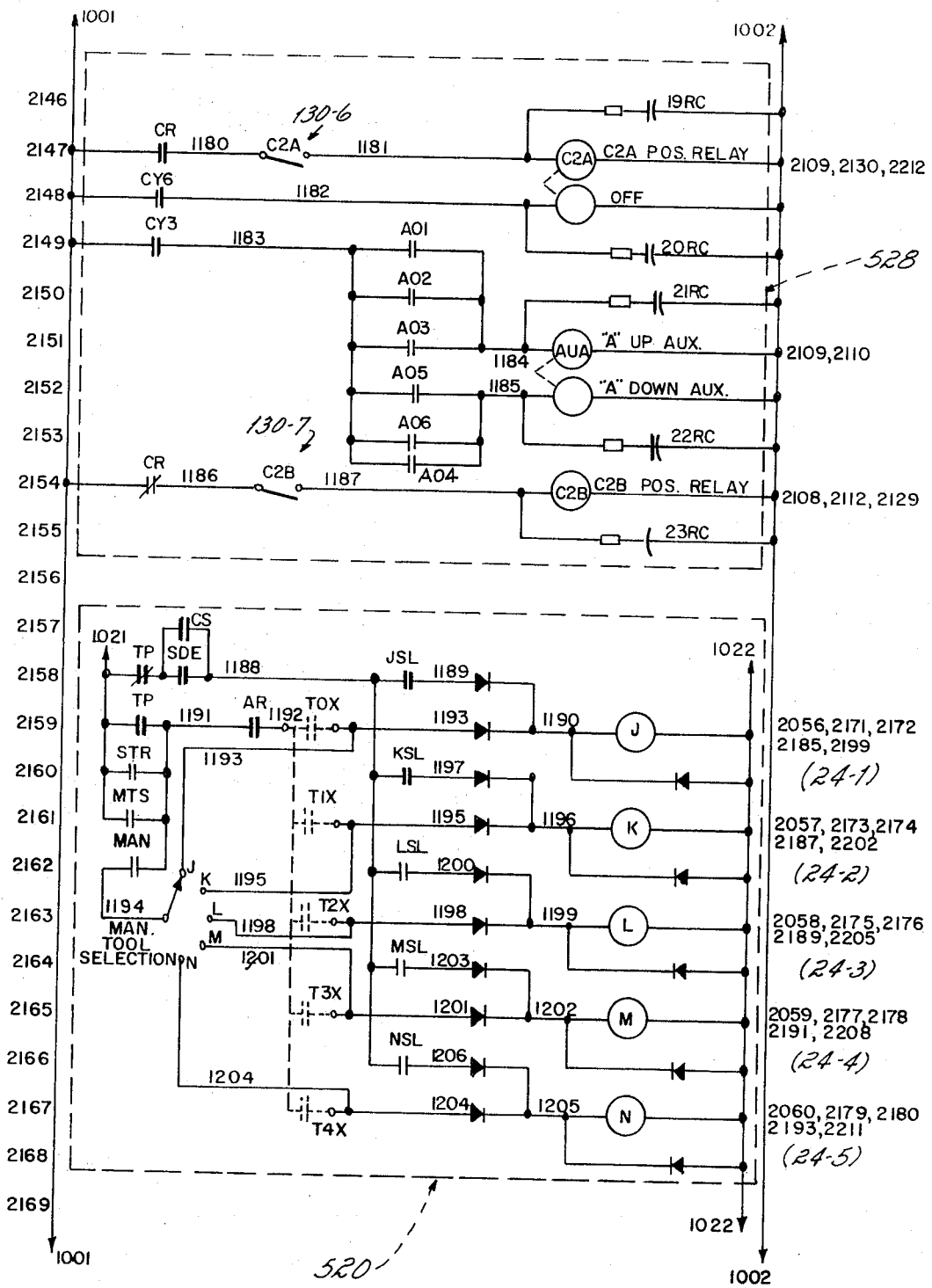

TOOL CHANGER

This invention is related to automatic tool changers for use on machine tools and is particularly directed toward an improved automatic tool changer with novel combinations of components and movements to handle tools with exceptional efficiency.

BACKGROUND OF THE INVENTION

Automatic tool changers have been known in the art and have been commercially available for some time for use with automatically programmed or numerically controlled machine tools. Most tool changers of the prior art have only been suitable for handling specific types of tools on specific types of machines. Generally, they employ rotating members such as rotary magazines and swinging arms to transport the tools to and from the machine head and storage. Such movements are satisfactory for some applications even though they involve high inertia and complicated rotary and indexing mechanisms. In other applications, as for example, when handling large tools and dealing with large masses and dimensions, these movements are costly and difficult to operate with precision. These movements have also often interfered with the space about the workpiece.

In applications where large heavy tools are employed, such as on large boring and milling machines, and particularly where a large work support or saddle area must be made accessible in front of or beneath the machine head, the devices of the prior art have generally been unsatisfactory or unsuitable. For example, large cylindrical magazines carrying large heavy tools become exceptionally difficult to properly rotate and properly register. Furthermore, transfer mechanisms which attempt to carry such tools rapidly in arcuate paths or which attempt to rotate or otherwise reorient these tools, are expensive to manufacture and also create difficulties in handling the inertia forces which such motions present.

Accordingly, it has been a primary objective of the present invention to provide an automatic tool changer for use on a machine tool which may handle large and heavy tools with simple linear movement. More particularly, it has been an objective of the present invention to provide a tool changer for more efficiently handling, supporting, and storing large and heavy tools with a simplified, safe, and reliable apparatus.

The present invention is predicated in part upon the concept of providing a tool changer employing a high degree of purely rectilinear motions along the three orthogonal coordinates or axis of the machine tool, and in providing for the transfer of tools between transfer members which move only in mutually perpendicular directions.

Another objective of this invention has been to provide an automatic tool changer which accommodates standard tools with a minimum of modification or change of the tool. Specifically, the tool changer of this application accommodates standard flanged tooling by simply milling keyways into opposite sides of the tool flange and by securing gripping plugs to the rear of the tool shank.

Another objective of this invention has been to provide a tool changer which is readily adaptable to numerous different styles of machines manufactured by differing companies. Heretofore, nearly all tool changers have been so integrated into the machine tool that the tool changer was unsuitable for application to any other machine tool. The tool changer of this application is so designed and constructed that it may be mounted upon vertical or horizontal boring mills, boring machines or even drilling machines manufactured by different manufacturers without any appreciable modification of the machine tool.

The present invention provides a tool changer which includes a storage magazine having a rectangular array of storage compartments and with the columns of the compartments contained in separate independently movable extendible drawers. The invention also provides for a transfer mechanism movable in a plane perpendicular to the axis of a tool in the spindle of the machine head and perpendicular to the tools within the storage compartments, to transfer tools between the storage magazine and the machine head, and having a carriage movable between the storage magazine and compartment carrying a pair of independently linearly movable tool forks, one for moving the tool exclusively from the storage magazine to the machine head and the other from moving the tool exclusively from the machine head toward the storage magazine. In addition, each of the forks is movable on the transfer mechanism to a plurality of different tool transfer positions adjacent the storage magazine.

The advantages of the present invention are primarily in the efficiency and simplicity in which a tool changer operation can be accomplished with large and heavy tools. Because the tool transfer elements all move only in rectilinear directions parallel to the tool machining axis, the tool changer is relatively inexpensive to manufacture, even in very large installations. It also has the advantage of being relatively easy to program.

Another advantage derives from the use of one of the two tool rectilinearly movable transfer forks being used exclusively to transfer tools from the tool magazine to the tool spindle, or tool holder, and the other transfer fork being used exclusively to transfer tools from the tool holder to the magazine. This programming greatly simplifies the movements and controls necessary to effect a complete tool change cycle.

Another advantage derives from the drawer styles storage magazine. By utilizing this arrangement, the number and the size motors required to move the tools into alignment with the tool transfer forks, and the inertia required to be controlled during this movement, are all minimized.

These and other objects and advantages of the present invention will be more readily apparent from the following detailed description of the drawings illustrating one preferred form of a tool changer, for use on a machine tool, according to the principles of the present invention, in which:

FIG. 1 is a perspective view of a horizontal boring mill incorporating the tool changer of the present invention;

FIG. 2 is an enlarged diagrammatic perspective view of the tool changer of FIG. 1;

FIG. 3 is an exploded diagrammatic perpsective view partially in cross-section of a tool carrying fork and tool storage compartment of the tool chamber of FIG. 1;

FIG. 3A is a diagrammatic cross-sectional view taken horizontally through a tool storage compartment of the storage magazine illustrating the tool engaging means;

FIG. 17 is a cross-sectional view taken along line 17—17 of FIG. 16 further illustrating the guides and associated controls for the tool carrying forks;

FIGS. 17A and 17B are views similar to FIG. 17 illustrating the dash pot and abutment assembly in an operative condition;

FIG. 20 is a cross-sectional view taken along line 20—20 of FIG. 18 further illustrating the drive mechanism controls and guides for the upper and lower tool carrying forks;

FIG. 21 is a semi-diagrammatic cross-sectional view taken through the spindle socket showing a tool lock in a released condition;

FIG. 22 is a view similar to FIG. 21 except that the tool lock is shown in a tool locking condition;

FIG. 24 is a diagrammatic drawing of the hydraulic circuit for operating a tool changer according to theis invention.

GENERAL DESCRIPTION

Figure 31:
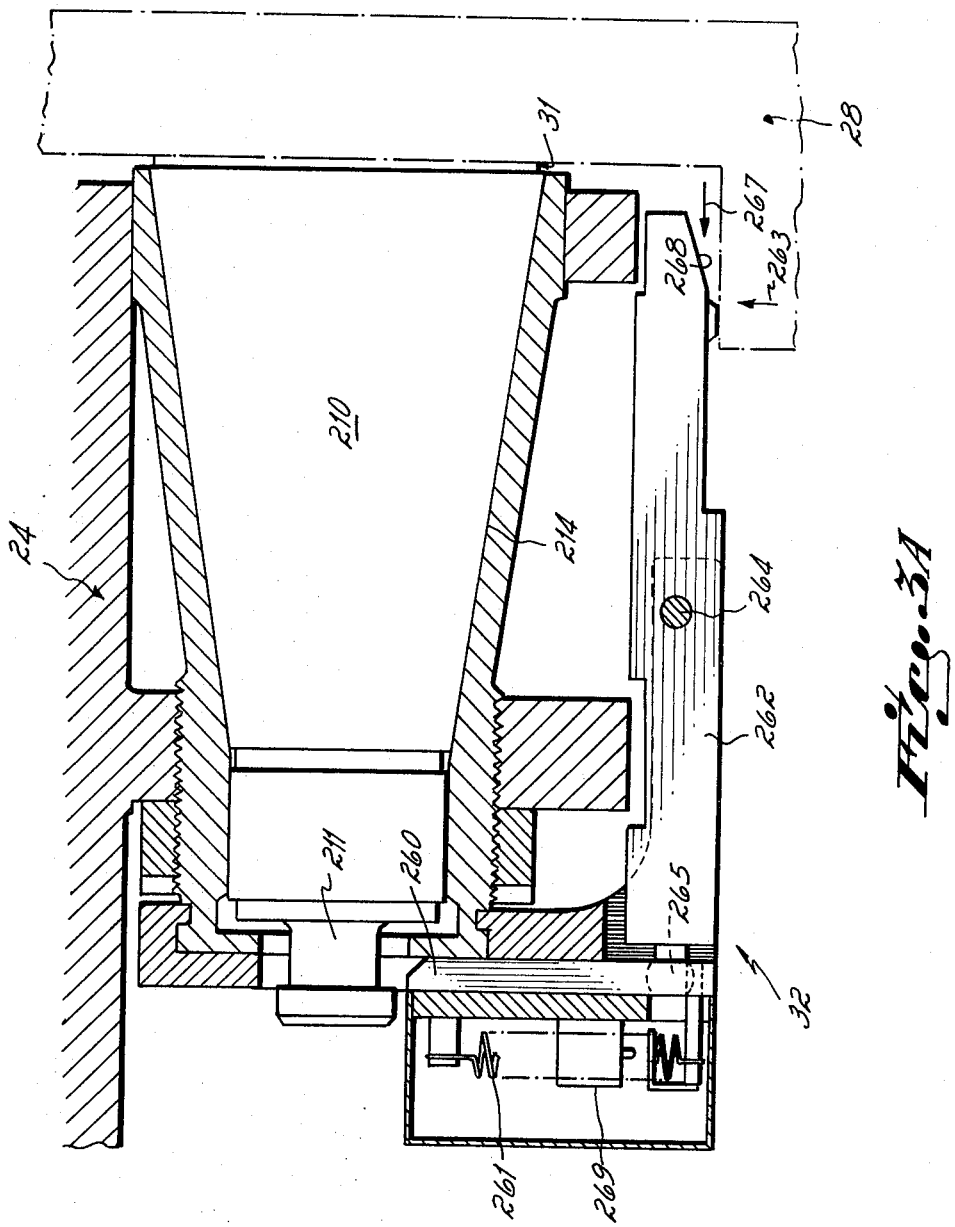
FIGS. 25–38 are diagrammatic drawings of the electrical control circuit for controlling a tool changer according to this invention.

FIG. 1 shows a tool changer embodying the present invention assembled on a horizontal boring machine 10, but it is to be understood that a tool changer according to the present invention can be used on a wide variety of machine tools including those in which the working tool is held in a vertical or in some other orientation. Because the tool changer of the present invention is particularly well-suited for use in a horizontal boring machine, it is described in that environment.

For convenience, the tool changer is described with reference to three coordinates, a vertical coordinate, and two horizontal coordinates including a longitudinal coordinate parallel to the spindle axis and perpendicular to the front of the machine and a lateral coordinate mutually perpendicular to the vertical and longitudinal coordinates.

In FIG. 1, the machine tool, shown as a horizontal boring machine 10, comprises a stationary vertical suporting column 11, a machine head 12 mounted to one side of the column 11 and vertically movable thereon, and a table or work support 13 mounted in front of the machine head 12 and movable in a horizontal plane. The machine head 12 carries the longitudinally oriented rotary spindle 14. The spindle 14 is longitudinally movable along its axis toward and away from the work support 13, and is adapted to carry a cutting tool mounted in a tool holder and to rotatably drive the cutting tool to perform a cutting operation upon a workpiece carried by the work support 13.

Relative positioning of the cutting tool and the workpiece is achieved by movements of the cutting tool, the workpiece, or both. The movements available for this purpose are the vertical movement of the machine head 12 on the column 11 which positions the cutting tool vertically relative to the workpiece, and longitudinal and lateral movement of the work support 13 which positions the workpiece horizontally relative to the cutting tool. In addition, longitudinal extension of the spindle 14 from the machine head 12 serves to feed the cutting tool axially into the work and to withdraw the spindle from the work to a tool change position. Also, the longitudinal motion of the work support 13 further serves to move the work away from the machine head to allow clearance for a tool change.

The boring machine may be of a conventional design well known in the art, and is described here only where such description will provide a better understanding of the unique way in which a tool changer according to the present invention cooperates with the machine tool in combination therewith.

A tool changer 20 according to a preferred embodiment of the present invention is mounted on the machine tool 10 on the column 11, in the same horizontal plane as the machine head 12, and is vertically movable on the column 11 in unison with the machine head 12. The tool changer 20 includes a storage magazine 21 mounted entirely to the side of the column 11 laterally opposite the column 11 from the machine head 12, and a tool transfer mechanism 22 which extends across the front of the machine 10 from the storage magazine 21 of the tool changer 20 to the machine head 12.

As shown in FIG. 2, the storage magazine 21 contains a rectangular array of storage compartments 23 arranged in vertical columns and lateral rows. The axis of the compartments are longitudinally oriented and thus parallel to the axis of the spindle 14. The compartments 23 are carried by a plurality of laterally spaced drawers 24, each drawer carrying one vertical row of compartments 23. Each drawer 24 is independently of the other drawers, longitudinally extendible from the storage magazine 21.

The tool transfer mechanism 22 includes a carriage 25 which is laterally movable back and forth between the spindle 14 and the storage magazine 21 on a pair of parallel rails 26 and 27 which extend from the machine head 12 to the storage magazine 21. A pair of tool forks 28 and 29 are vertically movable on the carriage 25. The movements of the tool forks 28 and 29 are independent of each other except that the upper tool fork 28 is always maintained above the lower tool fork 29. The tool forks 28 and 29 are shown in FIG. 2 in their normal rest positions at the extreme upper and lower ends respectively of the carriage 25. These positions are indicated in the scale 30 inscribed on the face of the tool changer 20. Between these rest positions lie the horizontal planes containing the horizontal rows of compartments 23 of the storage matrix of the magazine 21. These planes are also illustrated on the scale 30 on the face of the tool changer 20. In the machine illustrated in the drawings, the axis of the spindle 14 lies in the plane labeled "2" on the scale 30. By the vertical movements of the forks 28 and 29 on the carriage 25 and the lateral movement of the carriage 25 on the rails 26 and 27, each of the forks 28 and 29 can be moved back and forth between the spindle 14 and any one of the storage compartments 23 of the magazine 21. In this regard, the upper tool fork 28 is used to transport tools only from the storage matrix to the spindle, while the lower tool fork 29 transports tools only from the spindle to the storage matrix. To insert tools into, or withdraw tools from the spindle, the appropriate fork holding the tool is positioned in axial alignment with the spindle 14, and the storage magazine 21 and the transfer mechanism 22 of the tool changer 20 move longitudinally as a unit, with respect to the column 11 and the spindle 14 to carry tools into or out of the spindle socket.

The gripping of tools by the tool forks 28 and 29, and the transferring of tools back and forth between the forks and the compartments 23, storage magazine 21, are best illustrated in FIG. 3, which shows a tool carrying tool holder 31, one of the tool storage compartments 23, and the tool fork 28. The tool forks 28 and 29 are identical for the purpose of this discussion, therefore, only 28 is expressly referred to here. The engagement of a flanged tool holder 31 by the tool fork 28 is accomplished through relative lateral movement between the holder and the fork. Engagement of a tool holder 31 by a storage compartment 23, or by the spindle 14, is accomplished by relative longitudinal movement between the tool holder and the compartment. These engaging movements are straight line or rectilinear movements on the coordinate axis.

Because these movements are mutually perpendicular or orthogonal, engagement of the tool holder 31 by either the fork 28 or the compartment 23 constrains the tool holder 31 against movement with the other member. This feature permits the use of simplified engaging means to retain the tool holders in either the fork or the compartment while providing a failsafe transfer operation. These can both be in the form of passive engaging means, as shown generally as 32 in the storage compartment 23 (FIG. 3A) and as 33 in the tool fork 28 (FIG. 3).

All of the above structure is described in more detail below after the following general discussion of the tool changing operation.

OPERATION IN GENERAL

The sequence of operation for a tool change cycle is illustrated in the series of FIGS. 4–13. These figures show the replacement of a tool 36 in the spindle 14 after it has completed a machining operation, with a new tool 44 from the storage magazine 21 which new tool will perform the next machining operation, and then the subsequent returning of the used tool 36 to the storage magazine 21.

Figure 4:
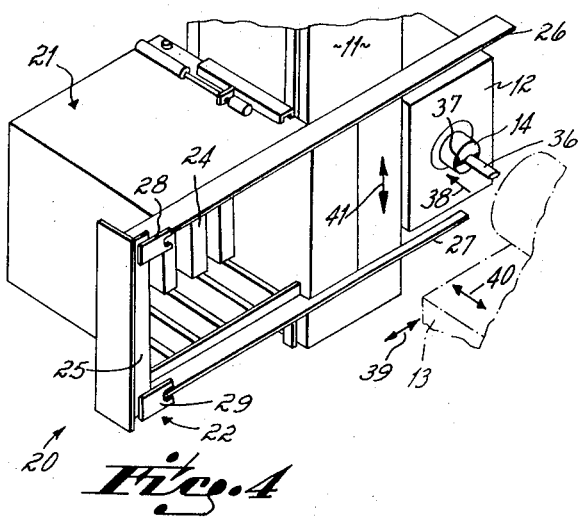
FIGS. 4–13 are diagrammatic illustrations of a tool changing operation of the tool changer of FIG. 1.

During the machining operation, the tool changer 20 and its movable members are in the "rest positions" as shown in FIG. 4. The tool changer 20 is in its rest position fully retracted in the longitudinal direction away from the workpiece to allow maximum free space for the machining operation. The drawers 24 are in their drawer rest positions fully retracted into the storage magazine 21. The carriage 25 is in its rest position at the extreme end (left of FIG. 4) of the rails 26 and 27. The forks 28 and 29 are in their rest positions at the upper and lower ends of the carriage respectively, as previously described.

Immediately after a machining operation has been completed using the tool 36 hereinafter called the old tool or used tool, the rotation of the spindle 14 is stopped to present the drive keyway 37 on the face of the spindle 14 at a predetermined angular orientation. The means for achieving this are described in more detail below. The spindle 14 simultaneously retracts as indicated by the arrow 38, longitudinally away from the workpiece and into the machine head 12 to a spindle "rest" position, ready for a tool change. At this point in time, a tool change cycle commences, and, preferably simultaneously with the tool change cycle, the machine head and workpiece are positioned relative to each other for the next machining operation. This positioning involves the lateral and longitudinal movement of the work table 13 as illustrated by the arrows 39 and 40 respectively, and vertical movement of the entire combination of machine head 12 and tool changer 20 on the column 11 as illustrated by the arrow 41.

A tool change operation commences with the selection of a new tool 44 by an addressing of its assigned storage compartment 23 within the magazine 21. This assigned compartment is addressed by referencing the row and column of the matrix where the compartment containing the selected tool is located, and by then guiding the upper tool fork 28 into engagement with the selected tool 44 at that location.

Figure 5:
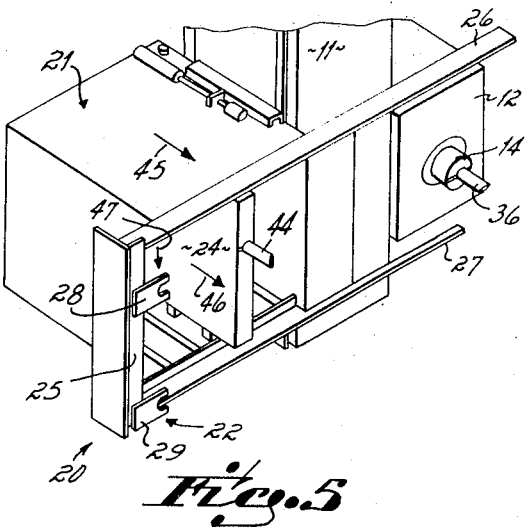
Figure 6:
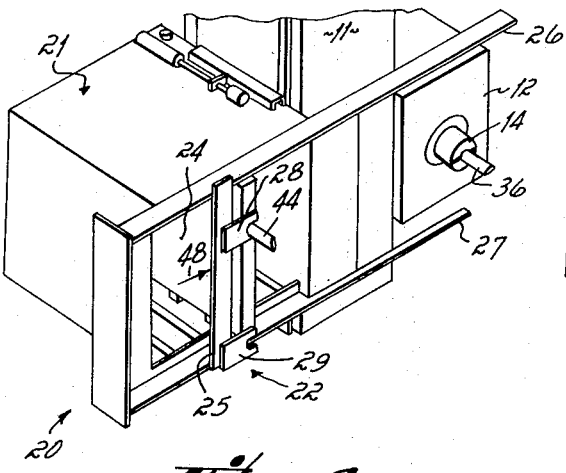
Figure 7:
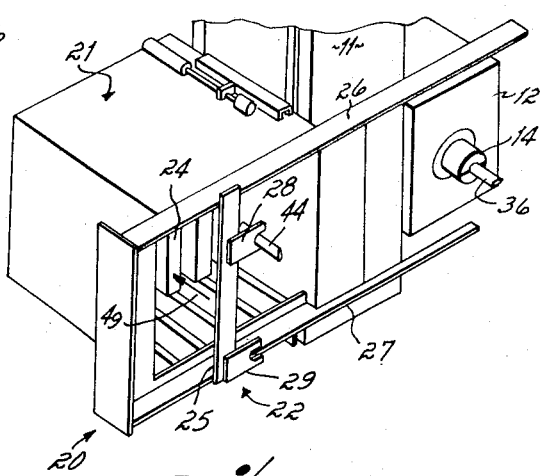

The first movements of the tool changer to occur after the selection of the new tool 44 are illustrated in FIG. 5. These movements may be, and preferably are, performed simultaneously. These movements include the longitudinal extension, as represented by the arrow 45, of the tool changer 20 from its rest position to a tool transfer position. In the transfer position of the tool changer, the tool forks 28 and 29 lie in a "transfer plane" which in the embodiment shown, is the same plane in which lies the flange of the old tool 36 within the spindle 14. In response to the addressing of the matrix column in which the compartment containing the tool 44 is located, the drawer 24 which contains all of the tools in that column extends from the storage magazine 21, as illustrated by the arrow 46, to bring the flange of the new tool 44 into the transfer plane. Similarly, in response to the selection of the matrix row in which the compartment containing the tool 44 is located, the tool fork 28 moves as illustrated by the arrow 47, from its rest position at the top of carriage 25 down the carriage, and in line with the addressed row.

When the tool changer 20, fork 28, and drawer 24 are so positioned, the carriage 25 moves laterally along the rails 26 and 27 to bring the fork 28 into gripping engagement with the tool 44 held by the drawer 24. This motion is illustrated by the arrow 48 in FIG. 6. Following this motion, the new tool will be held by both the fork 28 and the compartment 23 of the drawer 24. When the fork 28 has firmly engaged the tool 44, the drawer 24 retracts into the magazine 21 as illustrated by the arrow 49 in FIG. 7. Since the tool 44 is at this time constrained by the fork 28, it cannot move longitudinally with the drawer 24, so the tool 44 is pulled free of the drawer and remains supported solely by the tool fork 28.

Figure 8:
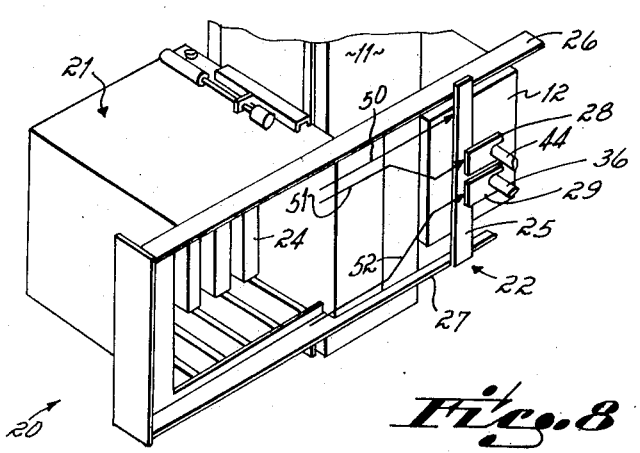

As shown in FIG. 8, a combination of movements of the carriage 25 and the forks 28 and 29 brings the lower tool fork 29 into engagement with the old tool 36 at the spindle 14 and brings the new tool 44 into a position immediately above the spindle 14. These movements include a lateral movement toward the spindle 14 of the carriage 25 on the rails 26 and 27 as illustrated by the arrow 50. Simultaneous with this movement the upper fork 28 moves down the carriage 25 as shown to prescribe a path illustrated by the arrow 51, and the lower fork 29 moves up the carriage 25, prescribing a path illustrated by the arrow 52, and into engagement with the tool 36 in the spindle 14.

Figure 9:
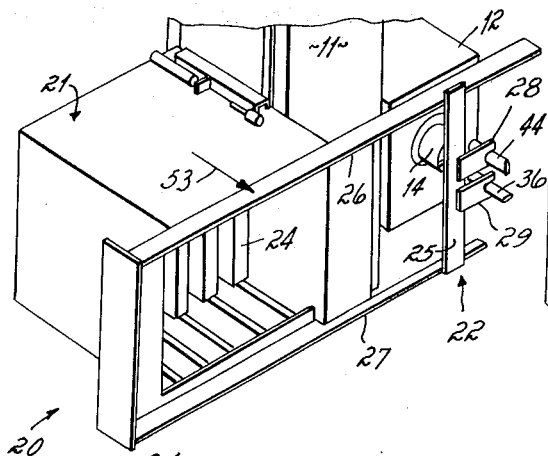
Figure 10:
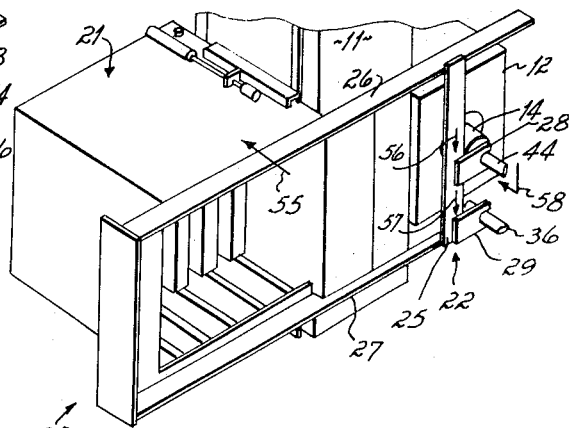

After the old tool 36 has been engaged by the fork 29, a tool lock located within the spindle as will be described more fully below, which tool lock has held the tool 36 within the spindle 14, releases the tool 36, wherein the tool changer 20 extends longitudinally, from its tool transfer position to a "tool change" position as shown by the arrow 53 in FIG. 9. This movement of the tool changer draws the tool 36 from the socket of the spindle 14, and is immediately followed by a downward movement of the fork 29 to the lower fork rest position at the lower end of the carriage 25 to carry the old tool 36 clear of the end of the spindle, and by a simultaneous downward movement of the tool fork 28 to bring the new tool 44 into axial alignment with the spindle 14. These fork movements are illustrated by arrows 56 and 57 in FIG. 10. As soon as the new tool is aligned with the spindle axis, the tool changer 20 retracts longitudinally from the tool change position back to its tool transfer position, as illustrated by arrow 55, and the tool lock within the spindle actuates to securely lock the new tool 44 in the spindle socket. These movements carry the new tool 44 in a path shown by arrow 58.

To return the used tool 36 to its assigned compartment in the storage magazine, the controls of the machine address the appropriate location within the matrix and proceed to direct the tool fork 29 to that location.

Figure 11:
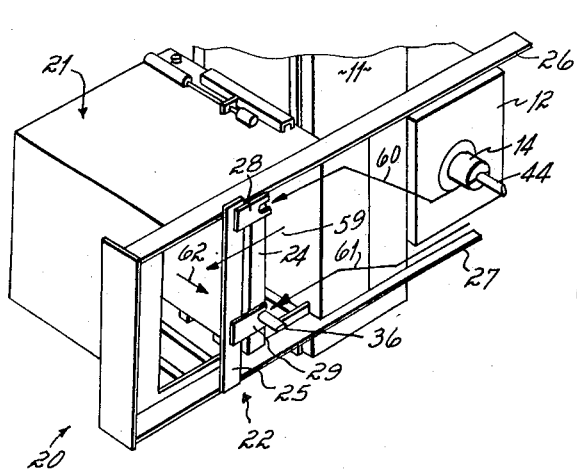
Figure 12:
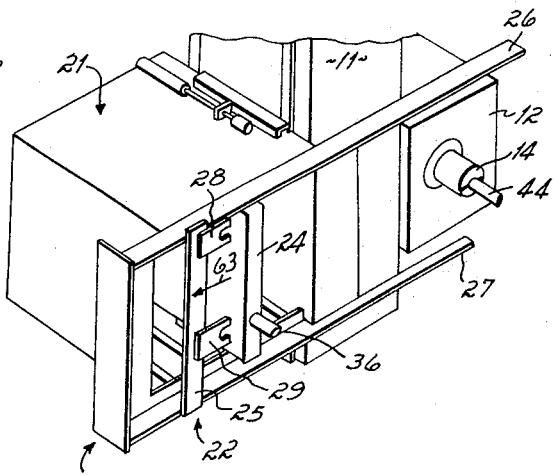

Referring to FIG. 11, the carriage 25 moves laterally along the rails 26 and 27 as shown by the arrow 59, pulling the tool fork 28 free from the tool 44 which tool remains firmly held by the spindle 14, and carrying the fork 29 with the old tool 36 toward the storage magazine 21. Simultaneously with this motion, the tool fork 28 moves up the carriage 25 to the upper tool fork rest position at the top of carriage 25 and prescribes a path illustrated by the arrow 60. The lower tool fork 29 travels along the carriage 25 to a position in line with the row of the matrix containing the compartment 23 to which the old tool 36 has been assigned. A typical path of travel of the lower fork 29 is illustrated by arrow 61. When the old tool 36 is in axial alignment with this assigned compartment, the drawer carrying that compartment extends as shown by the arrow 62, longitudinally to engage the tool 36 as it is held by the fork 29.

Once the storage compartment has engaged the old tool 36, the carriage 25 moves laterally, as illustrated by the arrow 63 (FIG. 12), toward its rest position at the extreme end of the rails 26 and 27. This motion causes the fork 29 to disengage the tool 36 which is now constrained against lateral movement by the compartment 23 of the drawer 24, which is left holding the tool 36. After disengagement from the tool, the fork 29 continues to move laterally and downwardly to its rest position depicted in FIG. 13.

Figure 13:
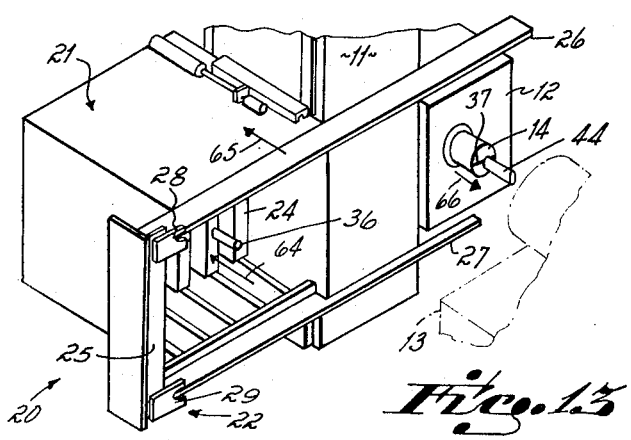

Referring now to FIG. 13, the drawer carrying the tool 36 retracts longitudinally into the storage magazine 21 as illustrated by the arrow 64. The entire tool changer 20 also retracts longitudinally from its tool transfer position to its rest position, as illustrated by the arrow 65, to provide clearance for the next machining operation to take place with the new tool 44 now in the spindle 14.

The next machining operation commences with the rotation of the spindle 14 and the extension of the spindle 14 from the machine head 12 as shown by the arrow 66 to feed the tool 44 toward the workpiece held by the work support 13.

DETAILED DESCRIPTION

Tool Changer Vertial Movement

Referring to FIG. 2, the tool changer 20 is supported for vertical movement on column 11 on a pair of vertical rails 71 and 72 mounted on the column 11, and by a bracket 73 mounted upon the machine head 12. The bracket 73 has a longitudinal trackway 74 in its upper surface to guide and support the upper portion of the tool changer frame through rollers (not shown) rotatably mounted to the lower surface of the rail 26 and positioned to ride in the trackway 74. The bracket 73 moves up and down with the machine head 12. The major portion of the tool changer 20 is supported upon the rails 71 and 72. The tool changer 20 is moved vertically upon the rails 71 and 72, in unison with the machine head 12, by motive power transmitted through a chain 76 secured at one end to the top of a tool changer mount 77 which suports the tool changer 20.

Figure 14:
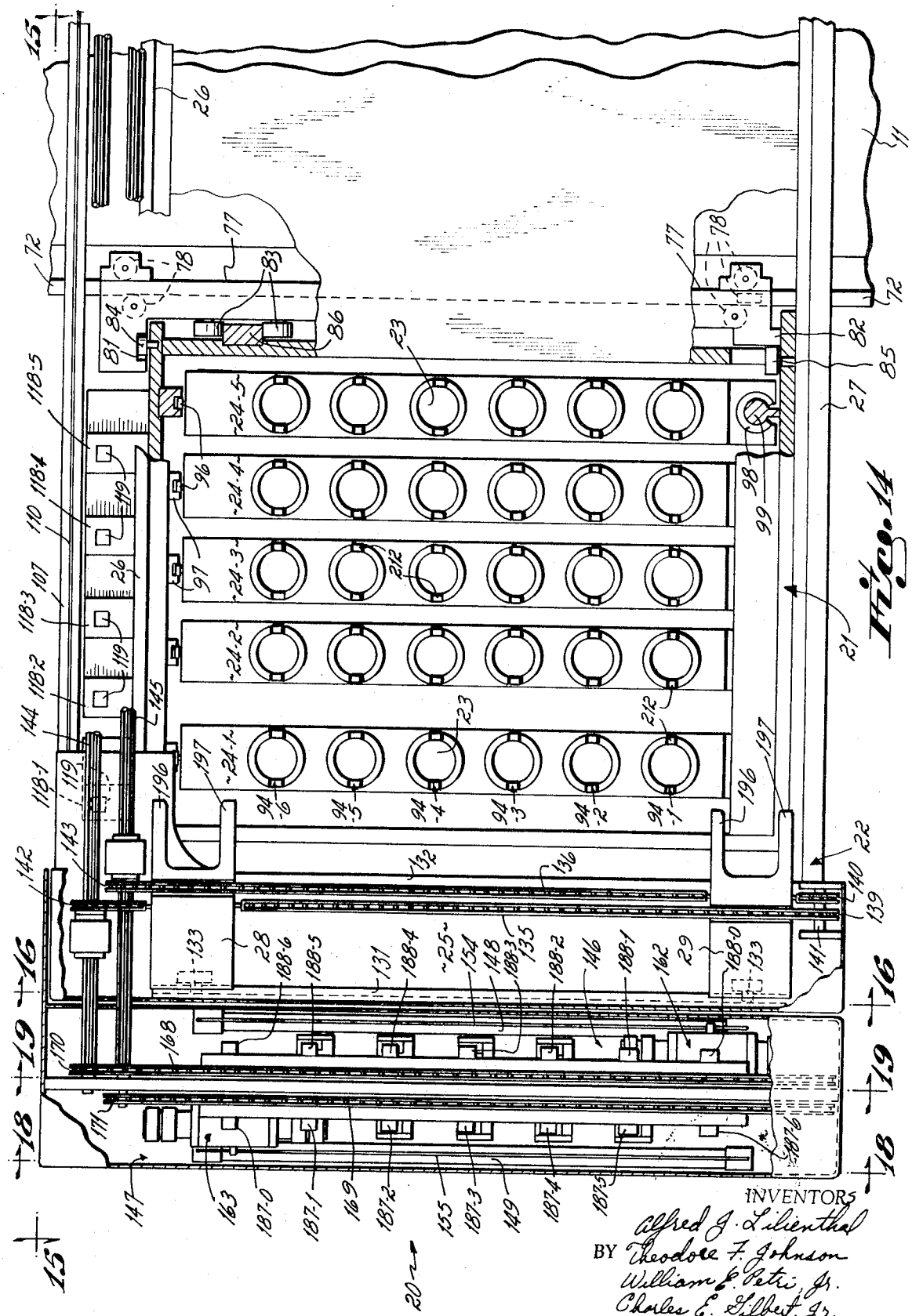
FIG. 14 is a front elevational view, partially broken away of the tool changer of FIG. 1.
Figure 15:
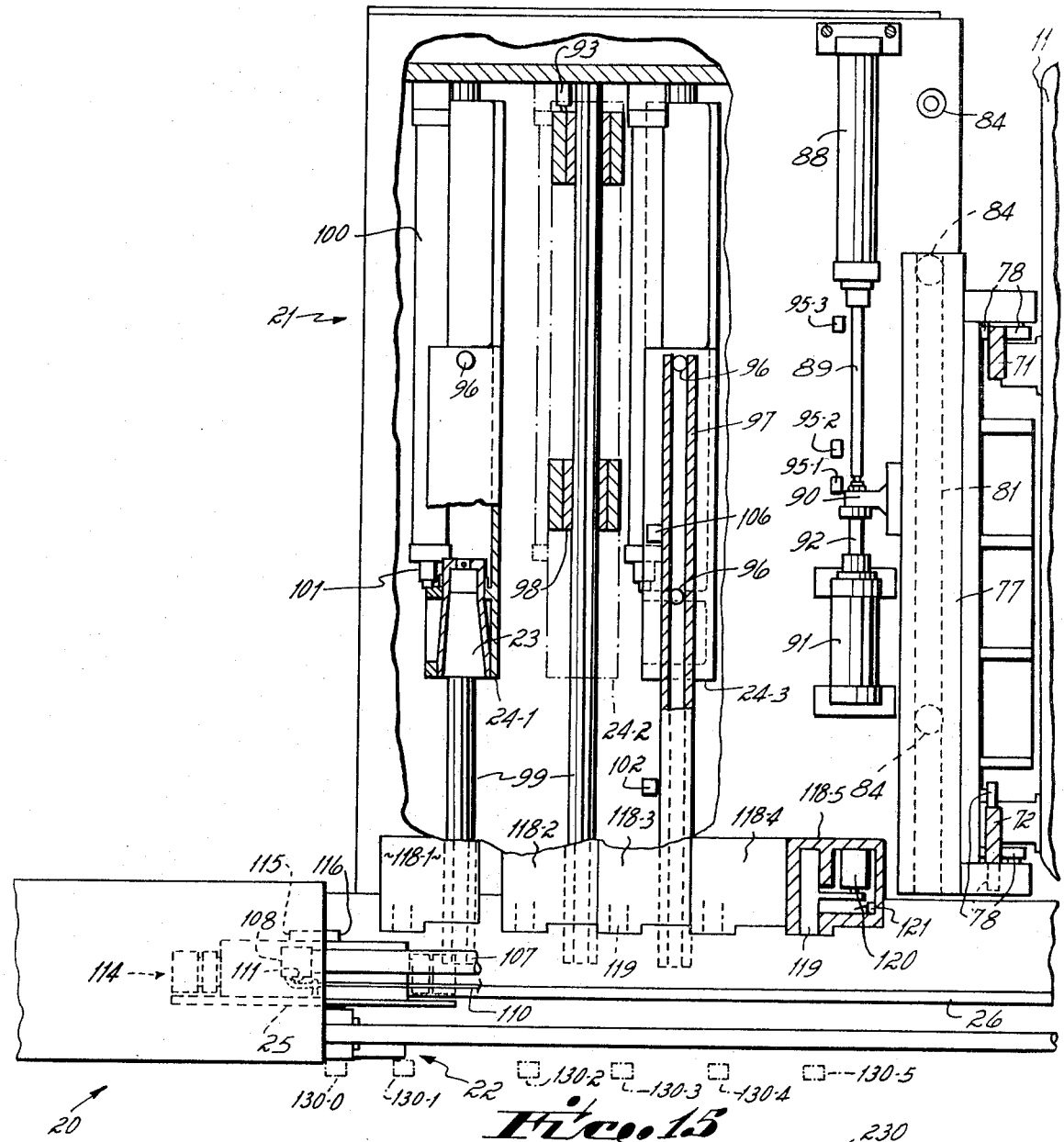
FIG. 15 is a top plan view partially broken away of the tool changer of FIG. 1 taken along line 15—15 of FIG. 14.

The tool changer mount 77 is best shown by reference to FIGS. 14 and 15. A plurality of rollers 78 are rotatably attached to the mount 77 and are spaced to substantially surround the rails 71 and 72 to guide the tool changer 20 in rectilinear vertical movement on te column 11.

Tool Changer Longitudinal Movement

For support of the tool changer 20 upon the mount 77, the mount 77 is provided with an upper longitudinal trackway 81, a lower longitudinal rail 82, and a set of rollers 83 rotatably attached to the mount 77. The tool changer 20 is supported for rectilinear longitudinal movement with respect to the mount 77 by an upper set of rollers 84, a lower set of rollers 85, and a longitudinal rail 86. The set of upper rollers 84 includes three rollers in longitudinal alignment rotatably attached to the top of the tool changer 20 and positioned to ride in the guideway 81 of the mount 77. The rollers of the lower set 85 are rotatably mounted to the bottom of the tool changer 20 and are in longitudinal alignment with each other and positioned to ride along the lower rail 82 of the mount 77. The longitudinal rail 86 is mounted to the side of the tool changer 20 and positioned to ride against the rollers 83 of the mount 77.

Longitudinal movement of the tool changer 20 with respect to the mount 77 is achieved partially by the fluid cylinder 88 mounted to the top of the tool changer 20. The movable piston rod 89 of the cylinder 88 is attached at its outer end to a bracket 90 rigidly supported on the mount 77. A second fluid cylinder 91, mounted on the top of the tool changer 20 and in line with the axis of the cylinder 88, and in opposition thereto, also partially contributes to the longitudinal position of the tool changer. The cylinder 91 has a piston rod 92 positioned to abut the bracket 90, but the piston rod 92 is not attached to the bracket 90. The cylinder 91 is spaced from the cylinder 88 so that when the piston rod 89 of the cylinder 88 approaches its maximum extent, the piston rod 92 is fully retracted but still in abutment with te bracket 90. This relationship defines the tool changer rest position. The cylinder 91 has a shorter stroke, but a larger diameter than does the cylinder 88, thus it can operate a greater force through a short distance with fluid of the same pressure. When the cylinder 91 is actuated, the piston 92 moves the bracket 90 against the force of te piston rod 89 for the length of the shorter strokes of the piston rod 92. This condition represents the tool changer tranfer position. Further motion of the tool changer from its transfer position to its change position and back is accomplished solely by te action of the cylinder 88.

To monitor the tool changer positions for feedback to the machine controls, there are provided three limit switches, 95-1, 95-2, and 95-3, mounted on the top of the magazine 21 to be actuated by contact with te bracket 90 when the tool changer is in the respective "rest," "tranfer," and "change" positions.

Storage Drawers

Figure 16:
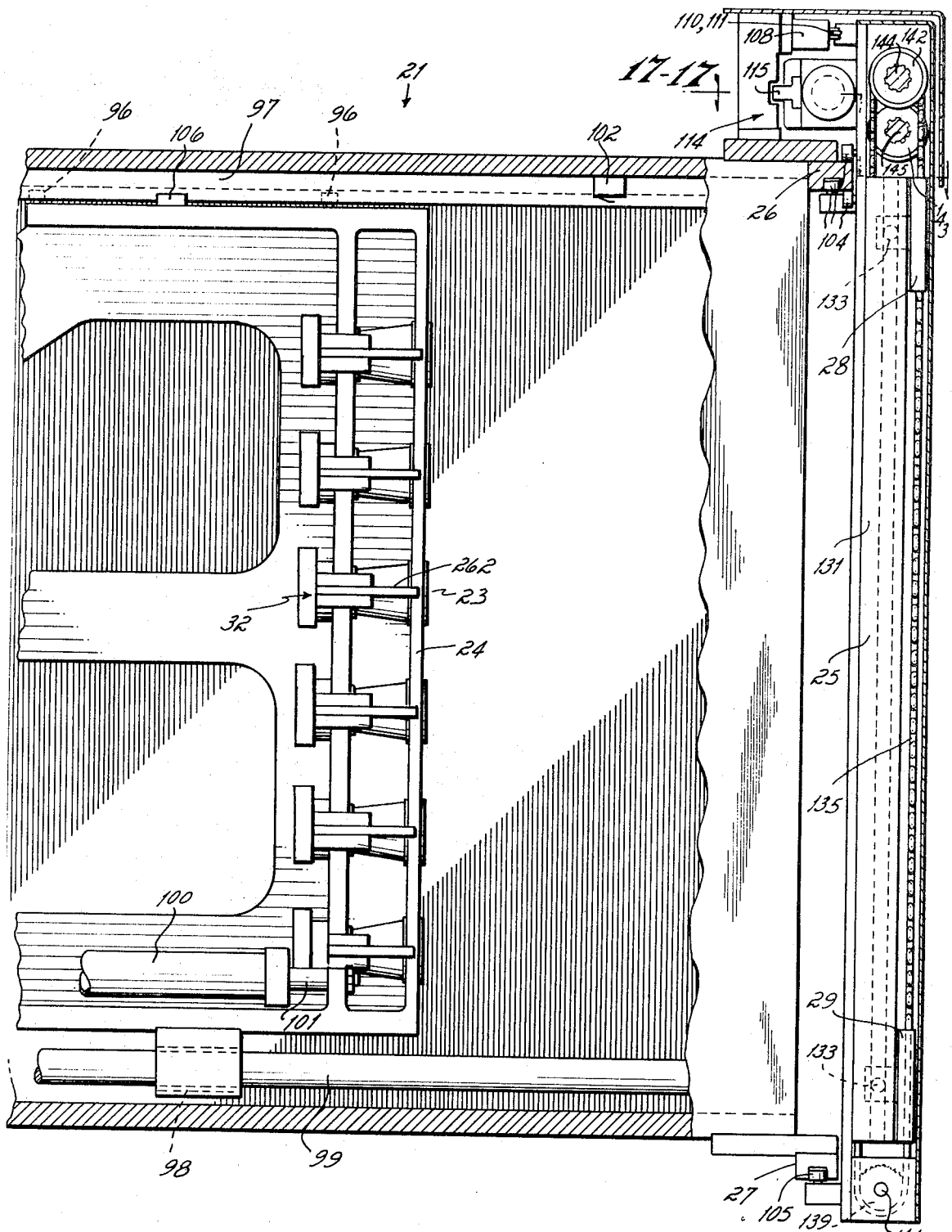
FIG. 16 is a cross-sectional view taken along line 16—16 of FIG. 14 illustrating a tool drawer and the tool carrying forks with associated guides.

The tool storage magazine 21 of the tool changer 20 contains a rectangular array of identical tool storage compartments 23 arranged in a plurality of vertical columns and a plurality of horizontal rows 94-1 through 94-6. The drawers 24 are normally fully retracted into the magazine 21, and to prove this normal condition, a set of limit switches 93-1 through 93-4 are provided, positioned at the rear of each drawer to detect the full retracted condition of each drawer. As pointed out previously, the row 94-2 is on the same vertical level as the center line of the spindle 14. A plurality of independently movable drawers 24-1 through 24-5, each carry a different one of the vertical columns of compartments 23. As shown in FIGS. 14-16, each drawr 24 has a set of rollers 96, rotatably mounted to the top of the drawer 24 and positioned to ride in a respective one of a set of longitudinal trackways 97, each rigidly attached to the inner surface of the top of the storage magazine 21. Each of the drawers 24 is supported at its lower end by a bearing 98 which slides longitudinally upon the longitudinally oriented guide rod 99 supported upon the bottom of the storage magazine 21. Te longitudinal movement of each of the drawers 24 into and out of the storage magazine 21, is achieved by one of a plurality of hydraulic cylinders 100, each having an extendible piston rod 101 attached to the drawer 24. To monitor the full extension of a drawer 24 for control purposes a limit switch 102 is provided on each trackway 97, and is positioned to sense the presence of a projection 106 on the top of each drawer 24.

Carriage Drive

The tool transfer mechanism 22, mounted across the face of the machine tool 10 and rigidly attached to the front of the storage magazine 21 moves as a unit longitudinally with the tool changer 20. The transfer mechaism 22 includes the carriage 25 which moves laterally on the rails 26 and 27 of the transfer mechanism 22. This is best shown by reference to FIGS. 14-16. The parallel laterally extending rails 26 and 27 are rigidly attached to the face of the tool changer 20 and form lateral trackways upon which the carriage 25 can ride. The carriage 25 has, rotatably mounted thereon, upper and lower sets of rollers 104 and 105, respectively positioned against the rails 26 and 27 to support the carriage 25 for rectiliner lateral movement on the rails 26 and 27. The motive force for moving the carriage 25 across the rails 26 and 27 is provided by a fluid cylinder 107. Whereas the motive means for this purpose may be any one of many standard forms and arrangements, what is illustrated in the preferred embodiment shown in the drawings is a cable cylinder 107 of the type manufactured by Tol-O-Matic, Inc. The cylinder assembly comprises an elongated cylinder having a doube-acting piston movable within the cyinder and having a cable attached at its opposite ends to the opposite ends of the piston. The cable extends through the end walls of the cylinder and around pulleys with some point along the cable attached to the member or load to be moved under the influence of fluid pressure within the cylinder.

The general arrangement of the carriage drive is shown in FIGS. 2, and 14-16. The cylinder 107 is mounted to extend laterally across the entire width of the tool tranfer mechanism and is secured at its opposite ends by a pair of mounting blocks 108 and 109. A cable 110 merges from oppostie ends of te cylinder 107, around pulleys 111 and 112 carried by mounting blocks 108 and 109 respectively, and is attached at a point along its length to the carriage 25. The position of the carriage 25 on the rails 26 and 27 is monitored by the machine controls through limit switches 130-0 through 130-8 positioned adjacent the upper rail 26 actuated by the presence of the carriage 25 adjacent to them. The switch 130-0 senses the rest position of the carriage 25 while switches 130-1 through 130-5 sense the position of the carriage adjacent the respective drawers 24-1 through 24-5. Switch 130-8 senses the position of the carriage 25 adjacent the spindle 14 and the switches 130-6 and 130-7 mark the boundaries of a region in which vertical movement of the forks on the carriage should occur as is explained in more detail below.

Carriage Stops

To stop the carriage adjacent the selected drawer of the matrix, the carriage 25 carries a movable abutment and dash pot assembly 114 which carries a pair of opposite laterally spaced abutting surfaces 115 and 116 which are alternatively effective, depending upon the direction of the travel of the carriage, to engage selectively actuatable carriage stop blocks 118-1 through 118-5 for stopping the carriage adjacent a selected drawer The carriage stop blocks 118-1 through 118-5 are spaced laterally across the top of the spool changer 20 and each corresponds to a respective one of the drawers 24-1 through 24-5. The stop blocks are best shown by reference to FIG. 15, particularly the section view of stop block 118-5. Each of the stop blocks includes a short pin 119 which, when a corresponding drawer of te magazine is selected, is longitudinally extended into the path of the leading one of the abutment surfaces 115 or 116 of the abutment and dash pot assembly 114, by actuation of a fluid cylinder 120. When the cylindr 120 is actuated, the shot pin 119 extends into the path of the abutment assembly 14, causing the carriage 25 to stall in precise registration with the selected drawer 24. The extensions of the shot pins 119 are electrically proved by limit switches 121 provided one at each of the stop blocks 118.

The details of the assembly 114 are shown more clearly in FIG. 17. The assembly 114 includes an abutment block 122 mounted to the center of a symmetrical pair of opposing piston rods 123. The opposite ends of the piston rods 123 terminate in the pistons of dash pots 124 and 125. The block 122 is maintained in equilibrium at a position intermediate the dash pots 124 and 125 by a pair of springs 126 and 127. A pair of spacer blocks 128 and 129 fixed to the carriage 25 and spaced on opposite sides of block 122, a distance equal to one-half of the combined widths of the pin 119 and the distance between surfaces 115 and 116. In operation, when one of the shot pins 119, for example shot pin 119-2, is actuated and extended into the path of the block 122, the carriage 25 comes to a cushioned stop as the piston rod 123 presses against one of the springs 126 or 127, against the dynamic resistance of the corresponding one of the dash pots 124 or 125. The carriage 25 comes to rest with its center line in alignment with tehe centerline of the shot pin 119-2 regardless of the direction of the travel of the carriage 25. This feature is illustrated diagrammatically in FIGS. 17A and 17B. As shown in FIG. 17A, when the carriage 25 is moving toward the right, the block 122 is driven against the spacer block 128, when the surface 116 is effective so that the effective surface 116 comes to rest at the midpoint of the block 122. Similarly, as shown in FIG. 17B when the carriage 25 is moving in the opposite direction, the block 122 is driven against the spacer 129, when the surface 115 is effective.

Fork Drive

The tool forks 28 and 29 are mounted for rectilinear movement upon the carriage 25. A pair of laterally spaced parallel vertical trackways 131 and 132 are rigidly attached to the front of the carriage 25. The forks 28 and 29 are both mounted in the same manner by sets of rollers 133 and 134 rotatably mounted to the tool forks and positioned to ride in the trackways 131 and 132 respectively. The forks 28 and 29 are driven vertically upon the trackways 131 and 132 through chains 135 and 136 respectively. The chains 135 and 136 are attached at both ends to their respective tool forks 28 and 29 and form a closed loop surrounding idler sprockets 139 and 140 respectively, each rotatably mounted upon the laterally oriented shaft 141 secured to the lower end of the carriage 25. At the upper end of the carriage 25, the chains surround drive sprockets 142 and 143 respectively which sprockets are drivably supported upon splined shafts 144 and 145 respectively which extend laterally the entire length of the tool changer and are rotatably supported at their opposite ends to the tool changer frame. The sprockets 142 and 143 slide laterally upon the splined shafts 144 and 145 as the carriage 25 moves laterally across tool changer 20. The sprockets 142 and 143 remain drivably engaged with these splined shafts 144 and 145 and, by rotation of the shafts, drive the tool forks up and down the carriage 25, through the chains 135 and 136. The shafts 144 and 145 are rotatably driven to carry the forks to their registered positions adjacent the selected rows of the matrix by a mechanism best shown by reference to FIGS. 14 and 18–20.

Figure 18:
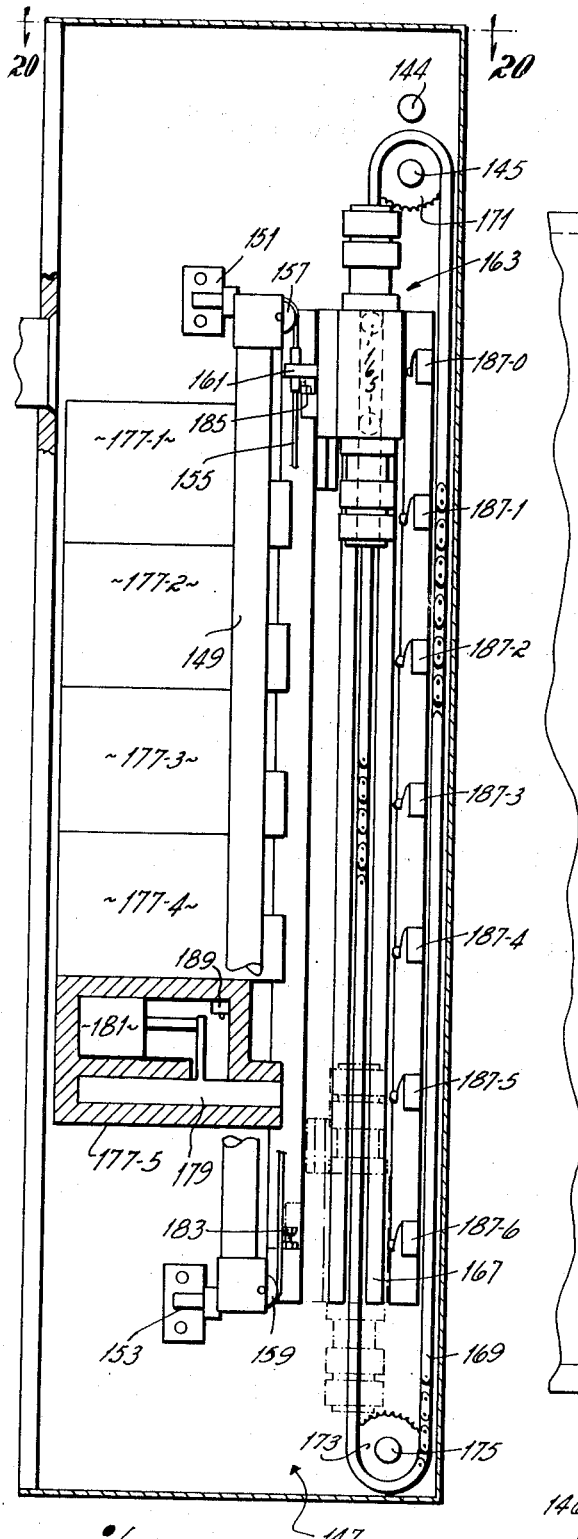
FIG. 18 is a cross-sectional view taken along line 18—18 of FIG. 14 illustrating the drive mechanism and controls for the lower tool carrying fork.

Referring to FIG. 18, the lower fork drive 147 is shown in detail. A cable cylinder 149 is mounted rigidly to the frame of the transfer mechanism 22 through a pair of mounting brackets 151 and 153. This cylinder is identical in kind to, but shorter than, the carriage drive cylinder 107. The cylinder 149 has an output cable 155 emerging from each end of the cylinder 149, extending around pulleys 157 and 159, and attached to the bracket 161 of an abutment block damper assembly 163. A set of rollers 165 are rotatably mounted to the assembly 163 and are positioned to ride in parallel vertical trackways 167 (FIG. 20). The assembly 163 is in all practical respects identical to the abutment and dash pot assembly 114 of the carriage 25 described above. A drive chain 169 is connected in a closed loop to the opposite ends of the abutment and dash pot assembly 163. The chain 169 extends around a drive sprocket 171 mounted on the end of the splined shaft 145 at the upper end of the transfer mechanism 22, and around an idler sprocket 173 rotatably mounted upon a transverse shaft 175 at the lower end of the transfer mechanism 22.

To position the fork 29 adjacent the selected row 94 of the matrix 21, a plurality of stop blocks 177-1 through 177-5 are provided. As shown by the sectional view of stop block 177-5, the blocks 177 are identical to the stop blocks 118, and each includes a shot pin 179 which is urged into the path of the abutment and dash pot assembly 163 by a fluid cylinder 181, and a proof limit switch 189. In the figure, the downward motion of the assembly 163 corresponds to upper motion of the tool fork 29, and therefore the numbering of the stop blocks is in the inverse order from that of the storage compartments to which they correspond. It should be noted that a stop block is not provided corresponding to the last or uppermost row 94-6. Instead, because the fork 29 can never be driven past the row 94-6, a permanent stop 183 is provided rigidly attached to the lower end of the transfer mechanism 122. Similarly, a permanent stop 185 is provided to correspond to the rest position of the lower tool fork 129. Adjacent each row, a plurality of switches, 187- 0 through 187-6, are provided. These switches detect the presence of the stop assembly 163 adjacent the rows 94 for purposes of controlling the machine timing and proving position of the stop assembly.

Figure 19:
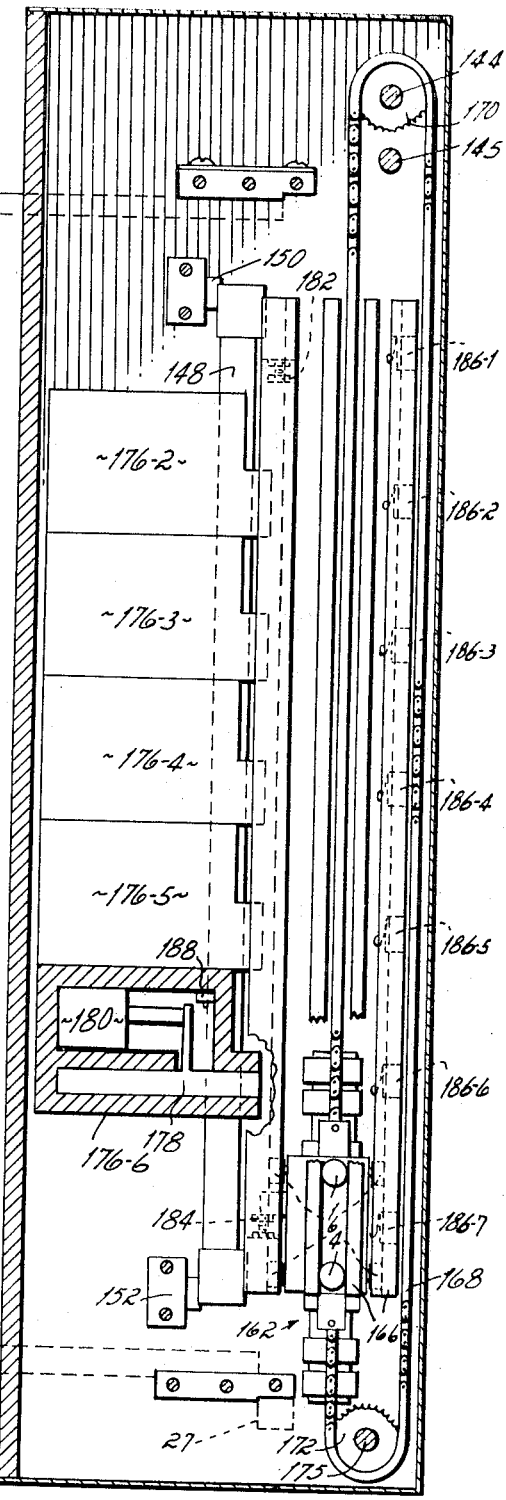
FIG. 19 is a cross-sectional view taken along line 19—19 of FIG. 15 illustrating the drive mechanism and controls for the upper tool carrying fork.

The upper fork drive assembly 146, shown in FIG. 19, is substantially identical to the lower fork drive assembly 147 of FIG. 18. The drive includes a cable cylinder 148 rigidly secured to the frame of the transfer mechanism 122 by a pair of brackets 150 and 152. The cable 154 of the cylinder 148 is secured to an abutment and dash pot assembly 162 which has a set of rotatably mounted rollers 164 which support the assembly 162 for rectilinear vertical motion on the trackways 166, rigidly mounted upon the frame of the transfer mechanism 122. An output drive chain 168 is connected in a closed loop at both ends to the assembly 162 and extends around the drive sprocket 170 drivably mounted to the end of the splined shaft 144 at the upper end of the transfer mechanism 22, and extends around the idler sprocket 172 which is rotatably mounted upon the shaft 175 at the lower end of the transfer mechanism 122. A plurality of stop blocks 176-2 through 176-6, having shot pins 178 driven by hydraulic cylinders 180, and monitored by proof switches 188, and which operate in the same manner as stop blocks 177, are provided to selectively stop the fork 28 adjacent the selected row 94 of the matrix 21. A permanent stop 182 is provided at the upper end of the transfer mechanism 22 to stop the abutment assembly 162 at a position corresponding to the position of fork 28 adjacent row 94–1. At the lower end of the transfer mechanism 22, another permanent stop point 184 is provided which is rigidly attached to the frame of the transfer mechanism 22 to stop the abutment assembly 162 in a position corresponding to the rest position tool fork 28. A plurality of switches 186–1 through 186–7 are provided to indicate the presence of the abutment assembly 162 adjacent the stops.

Because, according to the preferred embodiment of the invention, the tool changer 20 is vertically movable with machine head 12, the position of the spindle 14 relative to the storage magazine 21 is always fixed, as is arbitrarily picked to lie in line with row 94–2 of the magazine 21. Thus, for vertically positioning a fork at the spindle 14, the stops 176–2 or 177–2 are used. This would also be possible if the tool changer 20 were fixed relative to column 11 and the machine head 12 were moved to bring the spindle 14 to this vertical position for a tool change. If, however, in such an embodiment, according to this invention, where it was not desirable to so move the machine head 14, it would be necessary to provide additional control to locate the forks at the spindle. A feature such as providing a stop block movable in unison with the machine head would serve this purpose.

Tool Engaging Means

Engaging means for holding the tool holder 31 within the tool forks 28 or 29 are best illustrated by reference to FIG. 3. A tool holder 31 is provided with a flange 191 having lateral keys 192 extending along the upper and lower edges of the flange 191. The keys are provided with V notches 194 at the centers thereof. The edges 195 of the keys 192 are curved or tapered. The forks 28 and 29 are provided with upper and lower prongs 196 and 197 respectively. These prongs contain lateral keyways 198 on their inner surfaces for engagement with the keys 192. The upper prong 196 includes the passive engaging means 33 which serves to lock the tool holder 31 between the prongs of the fork. The engaging means 33 includes a vertically movable pin 199 which is biased downwardly to project into the keyway 198 of the upper prong 196. The pin 199 seats within the notch 194 of the tool holder flange 191 when the tool holder 31 is completely inserted between the prongs of the fork. The pin 199 has a lower tapered edge 200 which permits the upper key 192 to cam the pin 199 into the fork prong 196 when the tool holder is being inserted into or withdrawn from the fork. To lock the tool holder in the tool fork, a lock is provided to hold the pin 199 in its extended position. This lock is effective when neither a drawer 24 nor the spindle 14 is supporting the tool holder. The lock is comprised of a latch 201 pivotally mounted about a vertical axis 202 within a groove 203 in the upper prong 196. The pin 200 is provided with a circumferential groove 205 into which one end 206 of the latch seats when the pin is in its extended position. The end 206 of the latch 201 is biased into this locking position within the groove 205 by a spring (not shown). When a drawer compartment 23 is holding the tool holder 31, the striker plate 208 of the compartment will contact the end 207 of the latch 201, causing the latch to unseat from the groove 205 allowing the pin to cam upwardly against the bias of a leaf spring 204 to release the tool holder when the fork is moved laterally with respect to the tool holder 31.

The tool holder 31 is provided with radial drive keyways 209 machined from opposite sides of the flange 191, and a tapered shank 210 which terminates in a knobbed end 211. Each of the compartments 23 is provided with a striker plate 208 and key 212 at the rim of the compartment 23. The key is operable to engage the keyways 209 of the tool holders 31 to preserve their angular orientation while in storage for presentation to the tool forks. Each compartment is also provided with a tapered chamber 214 having a shape corresponding to the shape of the tapered shank 210 of the tool holder 31, and terminating at its inner end in a straight portion housing the passive engaging means 32.

The engaging means 32 include a slide 260 biased by tension spring 261 radially toward the axis of the compartment to snap into engagement about the knobbed end 211 of the tool holder 31 to retain the tool holder 31 within the compartment 23. The knobbed end 211 of the tool holder 31 is effective to cam the slide 260, which has a tapered edge 259, out of engagement with the tool holder 31 upon any substantial inward axial thrust between the tool holder 31 and the compartment 23 for the engaging of the tool holder 31 by the compartment 23.

Outward thrust however, will not cause disengagement of the tool unless a tool fork 28 or 29 is present adjacent the compartment supporting the tool 31. When a fork approaches the drawer to remove a tool (as indicated by the arrow 263) the fork abuts the end of the lever 262 which pivots on a vertical pin 264 fixed to the drawer. The other end of the lever carries a ball joint 265 which moves radially outwardly as the lever 262 so pivots to move the slide 260 against the tension of the spring 261 to release the tool. As the drawer retracts from the fork, the lever 262 holds the slide 260 out of engagement with the tool long enough to permit the knobbed end 211 to clear the engaging means 32. It should be noted that as a tool 31 is inserted into the drawer, the relative motion of the fork which holds the tool is in the direction of the arrow 267. The lever 262 is provided with a tapered edge 268 to cooperate with the fork to move the lever 262 to hold the slide 260 out until the drawer retracts. Thus, the slide is extended inwardly only when a tool is either securely locked within the compartment and solely supported thereby, or is completely absent from the compartment. Therefore, as a safety feature, it is possible to provide proof switches 269 in each compartment 23 to monitor the condition of the slide 260 of the engaging means 32 and to thereby detect partially seated tools.

Power Drawbar Tool Lock

To hold a tool holder 31 within the spindle 14 during machine operations, more positive engaging means are required than are provided within the storage compartments 23. Accordingly, a power drawbar tool lock is provided, as illustrated in FIGS. 21 and 22. The spindle 14 has a tapered bore 216 having a slope corresponding to the taper of the shank 210 of the tool holder 31. The tapered bore 216 terminates in a cylindrical chamber 217 at the inner end of the bore for receiving the knobbed end 211 of the tool holder 31. Within the cylindrical chamber 217 is a split collet 218 having a plurality of circumferentially spaced radially outwardly biased fingers 219. The collet fingers have hooked ends 220 which engage the knobbed end 211 of the shank 210 to draw the tool holder 31 into the bore 216 of the spindle 14. The rear end of the collet 218 is connected to reciprocatably movable drive means of any suitable conventional type for applying axial force to the collet drawbar assembly. The chamber 217 is provided with an inner sleeve having a camming surface 221 which cooperates with corresponding surfaces on the outer sides of the collet fingers 220, to cam the fingers into hooked engagement with the knobbed end 211 of the tool holder to lock the tool holder in the spindle. The drawbar is shown in its locked condition in FIG. 22.

For releasing the tool lock and loosening the tool holder 31 from the bore 216, the drawbar assembly, through actuation of the drive means, is moved axially outwardly, driving the collet with an abrupt movement against the end surface 223 of the tool holder shank 210. The impact thus transmitted to the tool holder 31 loosens it from the bore 216.

Tool locking is verified by limit switches 222 at the spindle drive means. These switches are actuated only when a tool is properly locked in the spindle bore. When either the drawbar is extended, or the drawbar is retracted beyond its locked position because no tool is present in the bore, the switch does not actuate. Also, located within the machine head 12 is a limit switch 215 positioned to verify that the spindle 14 is retracted to the tool change position into the machine head 12 and ready for a tool change operation.

Spindle Orientation

The machine tool spindle 14 is provided with a means for stopping the rotation of the spindle so that the flange 191 of the tool holder 31 is in a predetermined angular orientation for engaging the tool forks in the manner illustrated in FIG. 3.

Figure 23:
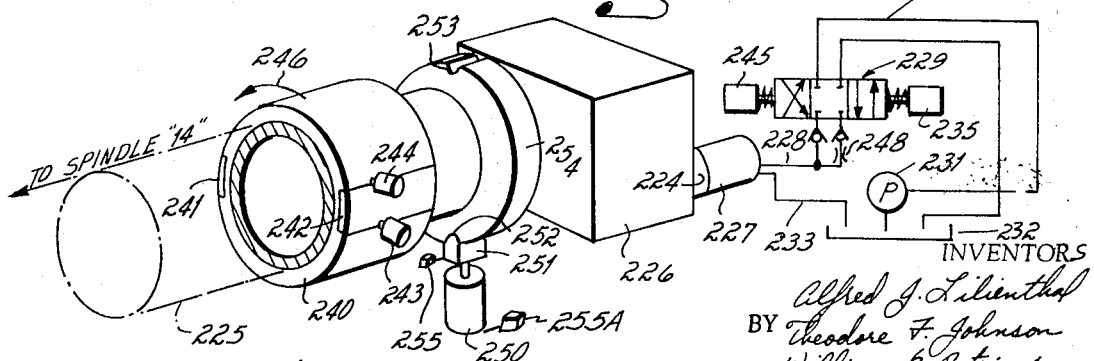
FIG. 23 is a diagrammatic perspective illustration of the spindle orienting mechanism and a portion of the associated controls.

The spindle drive mechanism for accomplishing this orientation is illustrated in FIG. 23.

A shaft 225 connected to the spindle 14 is drivably connected through a gear box 226 and a hydraulic clutch 224 to a rotary hydraulic motor 227. The gear box 226 imposes a substantial speed reduction from the hydraulic motor 227 to the shaft 225. The hydraulic motor 227 is connected through a fluid input line 228 and a hydraulic valve 229 to a source of high pressure fluid 230 supplied by a pump 231. The input of the pump 231 communicates with a fluid reservoir 232. The motor 227 also has a drain 233 also connected to the reservoir 232. The valve 229 is in the high speed position with the motor 227 connected directly to the high flow line 230. When the valve 229 is in this high speed position, the hydraulic motor 227 receives high flow fluid directly from the high pressure line 230 through the valve 229 and into line 228, to drive the shaft 225 of the spindle 214 at high speed. The valve 229 is retained in the high speed position by the constant energization of a solenoid 235 connected to the spool of the valve 229.

The spindle shaft 225 is provided with a nonferrous sleeve 240 which substantially surrounds the shaft 225. This sleeve is axially slidable so as to be aligned with a pair of switches 243, 244 only in the neutral or central position to which it is moved only for tool changes. There are two longitudinal ferrous strips 241 and 242 spaced diametrically opposite each other on the shaft 225. Positioned adjacent the sleeve portion 240 and stationary relative to the machine tool 10, are a pair of magnetically operated reed switches 243 and 244. These switches are normally open switches which close when the ferrous strip 241 or 242 passes them upon rotation of the shaft 225 to generate signals corresponding to predetermined angular positions of the shaft 225. Due to the direction of rotation of the shaft shown by the arrow 246, the switch 243 closes before switch 244 as the ferrous strip passes. Once the machine controls have signaled for the stopping of the spindle, the next signal to be generated by the switch 243 causes solenoid 235 to de-energize and a solenoid 245, also connected to the spool of valve 229 to energize, causing the valve to assume the condition in which the high pressure hydraulic fluid from line 230 is forced to flow through the flow control valve 248, thus supplying fluid at a reduced volume to the hydraulic motor 227, thereby driving the spindle shaft 225 at a reduced or slow speed. The magnetic switch 244 is connected in series between a source of electrical power and a solenoid 250. After the actuation of the slow speed drive, the next signal from the switch 244 is effective to sequentially stop motor 227, disengage clutch 224, and drive a plunger 251 into one of two diametrically opposed notches 252 and 253 of a collar 254 which surrounds the shaft 225. This sequential action stops and accurately locates the spindle shaft 255 in one of two precisely defined angular orientations corresponding to the positions of the notches 252 and 253 about the spindle shaft 225 in the following manner. The width of the ferrous strip 242 is such that approximately simultaneous with the closing of the switch 244, the switch 243 opens, thereby deenergizing the solenoid 245 causing the valve 229 to asssume the position in which the fluid ports to the motor are completely closed. In this way, the hydraulic motor 227, through the gear train 226, applies a torque to finally brake the rotating spindle 14 to a stop, while the plunger 251 serves to positively and accurately register the stop position of the rotating spindle to accurately stop the spindle at a predetermined angular orientation. To insure that the spindle is properly oriented, proof switches 255, 255a are provided to monitor the actual condition of the latch pin 251.

Fluid Control Circuit

The fluid control circuit of the tool changer is illustrated in FIG. 24. The hydraulic components of this circuit are illustrated in their rest position and the solenoid valves are shown in their de-energized condition. In the specific embodiment described, the fluid control circuit is a hydraulic circuit for supplying motive fluid to control and effect the movements of the tool changer of the present invention. The mechanical movements of the tool changer are achieved for the most part through fluid motors of the hydraulic cylinder type.

The hydraulic power source includes a pump 300 having an input 301 communicating with a low pressure reservoir 302, and having an output 303 communicating with a fluid supply line 305. The pump 300 supplies fluid from the reservoir 302 to the fluid supply 305 at high pressure. A low pressure fluid return line 306 is provided communicating with the reservoir 302 for returning low pressure fluid to the reservoir.

The cylinders 88 and 91, which are provided for longitudinal movement of the tool changer 20, are diagrammatically illustrated in FIG. 24 with the tool changer 20 in its rest position. The "rest-transfer" cylinder 91 is a double acting cylinder having two ports 309 and 310 selectively connecting its two chambers to the high and low pressure lines 305 and 306 through a three position four-way valve 311. The valve 311 is operated by a pair of solenoids 312 and 313. When neither solenoid is energized, all ports to the cylinder 91 are blocked and no motion of the cylinder takes place. When only solenoid 313 is energized, the port 309 connects to the high pressure supply line 305 and the port 310 drains to the low pressure return line 306, whereby the cylinder 91 assumes a retracted condition corresponding to the tool changer rest position. When the solenoid 312 is energized, port 310 is connected to high pressure and port 309 is connected to low pressure, whereby the cylinder 91 assumes an extended position for moving the tool changer to its transfer position.

The "transfer-change" cylinder 88 has its opposing chambers similarly connected, through ports 319 and 320, through the three position four-way valve 321 to the high and low pressure lines 305 and 306. The valve 321 is operated by two solenoids 322 and 323. When neither solenoid is energized, the valve 321 blocks all ports to the cylinder 88 immobilizing the cylinder. When solenoid 323 is energized, the port 319 is connected to high pressure and the port 320 is connected to low pressure, whereby the cylinder 88 is driven to its retracted position corresponding to the tool changer change position. When solenoid 322 is energized, the port 320 is connected to high pressure and the port 319 is connected to low pressure, whereby the cylinder 88 assumes its extended position, to move the tool changer from its change position to its transfer position, and further to its rest position.

Because the cylinders 88 and 91 are connected in mechanical opposition, and further because the shorter stroke cylinder 92 is of a larger diameter than the longer stroke cylinder 88, the cylinder 91 overrides cylinder 88 when both are driven in opposition to each other. Therefore, the following positions of the valves 311 and 321 are effective to move the tool changer to its various positions: Movement from the rest position to the change position is achieved by energizing solenoids 312 and 322, causing the cylinder 91 to fully extend against the opposing force of cylinder 88 which is partially retracted under the opposing force of cylinder 91. Movement from the transfer to the change positions is achieved by energizing solenoid 323, causing cylinder 88 to fully retract, with cylinder 91 out of engagement with the bracket 90 and ineffective. Movement from the change position to the transfer position is achieved by energizing solenoids 312 and 322 causing the cylinder 88 to extend until it is met by the superior force of the extended cylinder 91. Motion from the transfer position to the rest position is achieved by energizing solenoids 322 and 313, causing cylinder 91 to retract and thereby permit the cylinder 88 to fully extend to move the tool changer to its rest position.

The carriage drive cylinder 107 is a double-acting cylinder having ports 325 and 326 connecting its opposing chambers to the lines 305 and 306 through a three position four-way valve 327. The valve 327 is operated by a pair of solenoids 328 and 329, and, hence, when both solenoids are de-energized, the valve blocks both of the ports 325 and 326 to immobilize cylinder 107. The ports 325 and 326 are alternatively connected to the opposite pressure lines 305 and 306 by the alternative energizing of the solenoids 328 and 329 to move the carriage in one direction or the other.

The double-acting drawer stop block cylinders 120-1 through 120-5 are each connected through a corresponding one of a plurality of two position four-way solenoid valves 330-1 through 330-5. When the solenoids of the valves 330 are energized, the cylinders 120 fully extend the shot pins 119. Alternatively, when the solenoids are de-energized, the cylinders 120 fully retract to retract the shot pins 119.

The double-acting drawer cylinder 100-1 through 100-5 have opposing chambers connected to different ones of the high and low pressure lines 305 and 306 through two position four-way solenoid valves 332-1 through 332-5 which, when energized, cause the cylinders 100 to be fully extended, and when de-energized, cause the cylinders 100 to be fully retracted.

In a manner similar to the manner in which the carriage cylinder 107 is connected, the upper fork cylinder 148 is connected through a three position four-way valve 334 having oppositely acting control solenoids 340 and 342, and the lower fork cylinder 149 is connected through a three position four-way valve 335 having oppositely acting control solenoids 341 and 343 and each across the high and low pressure lines 305 and 306.

Also, in a manner similar to the manner in which the drawer movable stop cylinders 120 are connected, the upper and lower fork movable stop cylinders 180-2 through 180-6 and 181-1 through 181-5 respectively are connected to the high and low pressure lines 305 and 306 through two position four-way solenoid valves 336-2 through 336-6 and 337-1 through 337-5 respectively.

Electrical Control Circuitry

The electrical control circuitry for the tool changer described above can take many forms. An acceptable control circuit which is especially designed for use with a numerically controlled machine tool which operates under the control of a program read from a punch-coded paper tape is set forth in detail in the schematic diagram of FIGS. 25-38 presented in conventional ladder diagram form. A suitable control circuit can be constructed by anyone skilled in this art from this schematic diagram, or from the mechanical and hydraulic description, or the discussion of the operation contained elsewhwere in this specification. To facilitate the understanding of the operation of the machine, this diagram is discussed generally here, and the circuitry is further explained in conjunction with the detailed discussion of the operation which follows this discussion.

Figure 25:
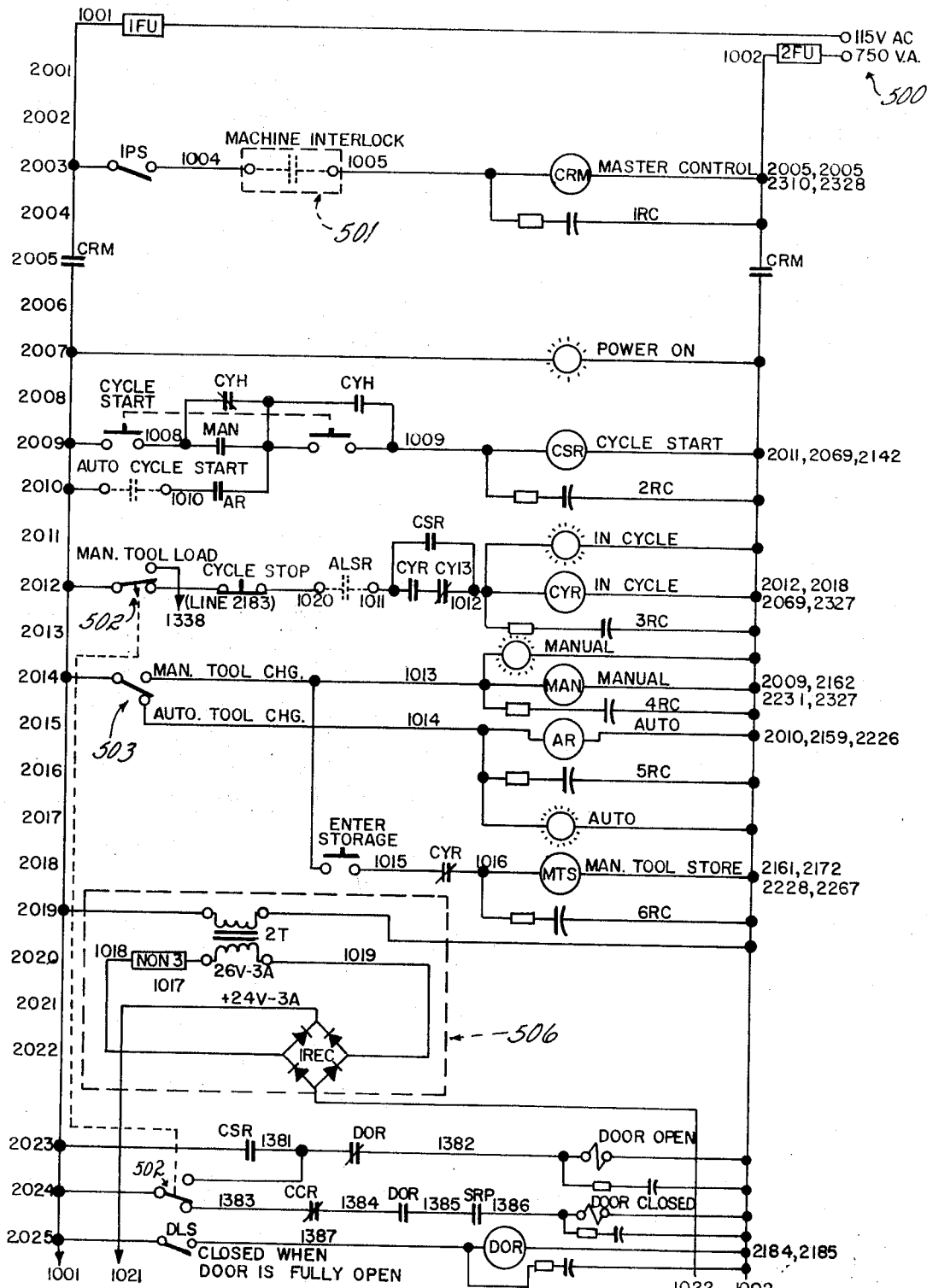
Figure 26:
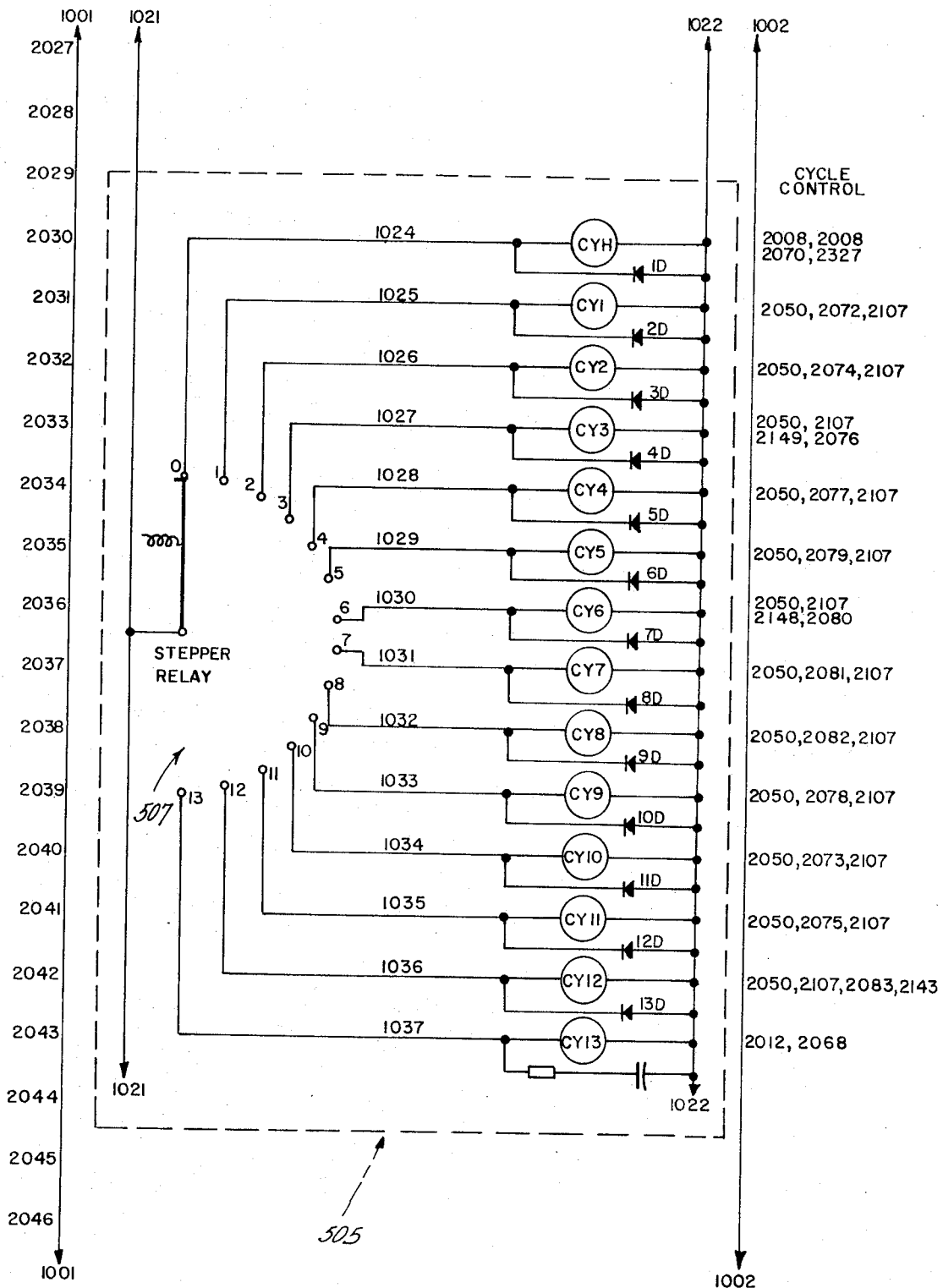
Figure 27:
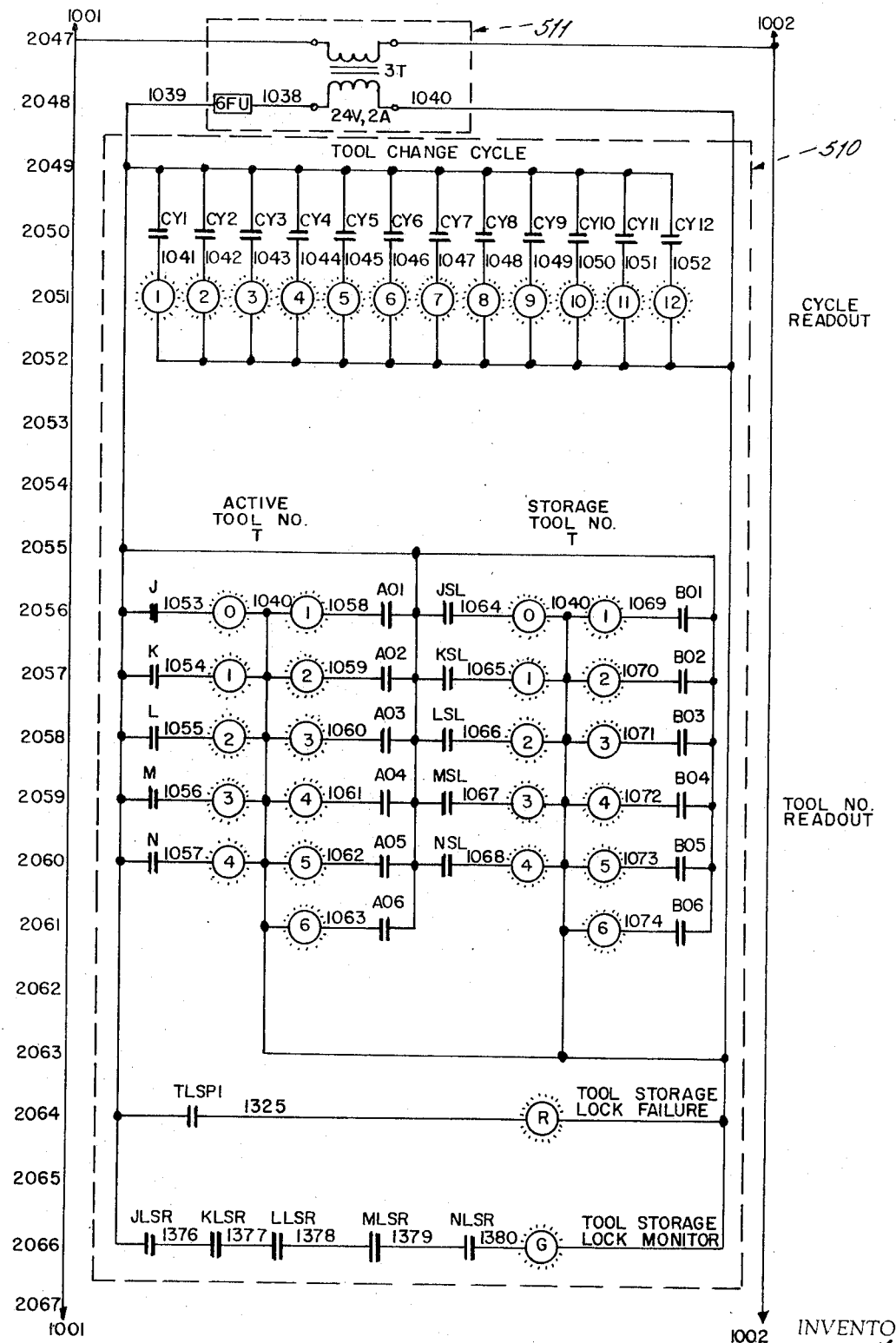
Figure 28:
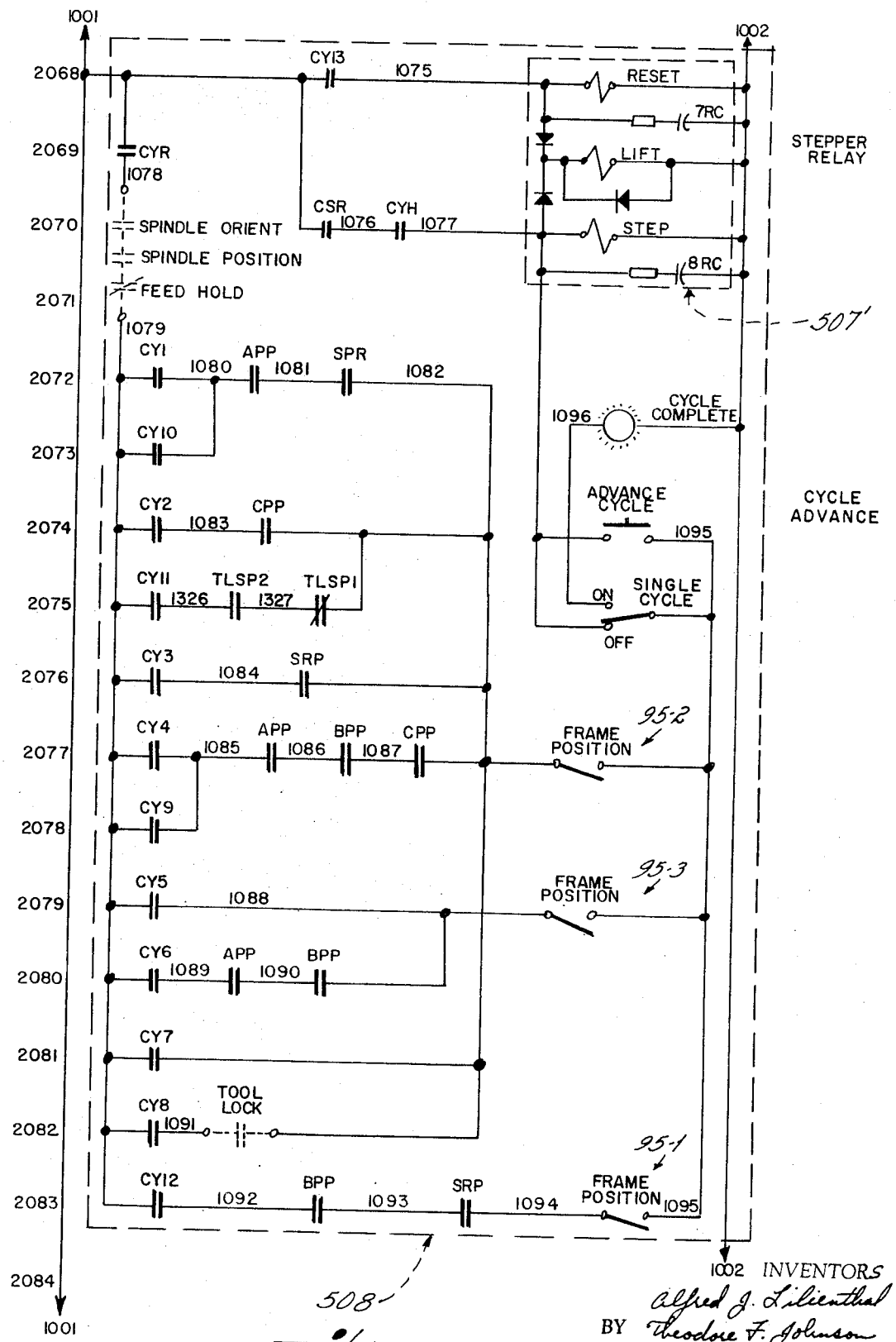
Figure 29:
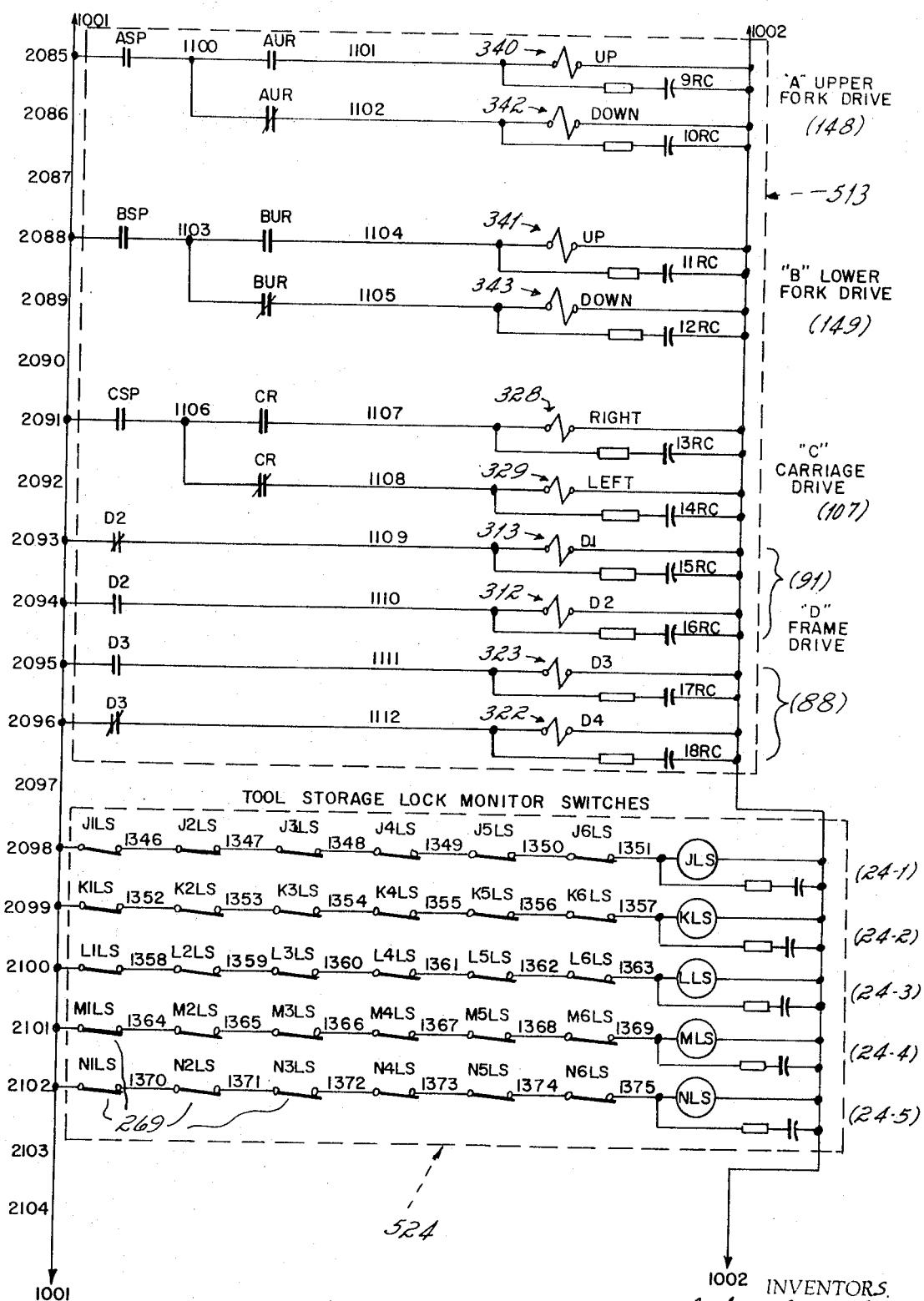
Figure 30:
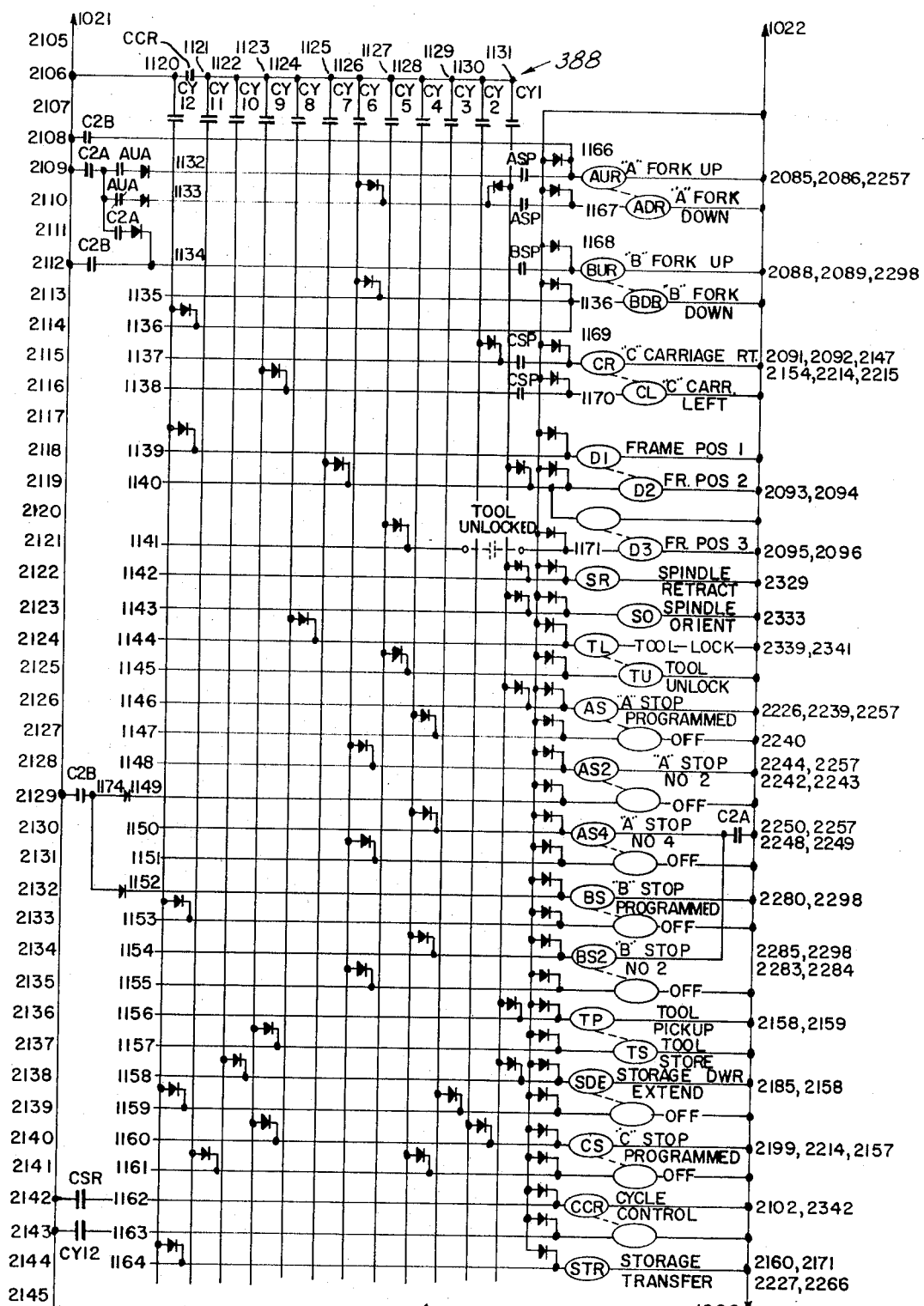
Figure 32:
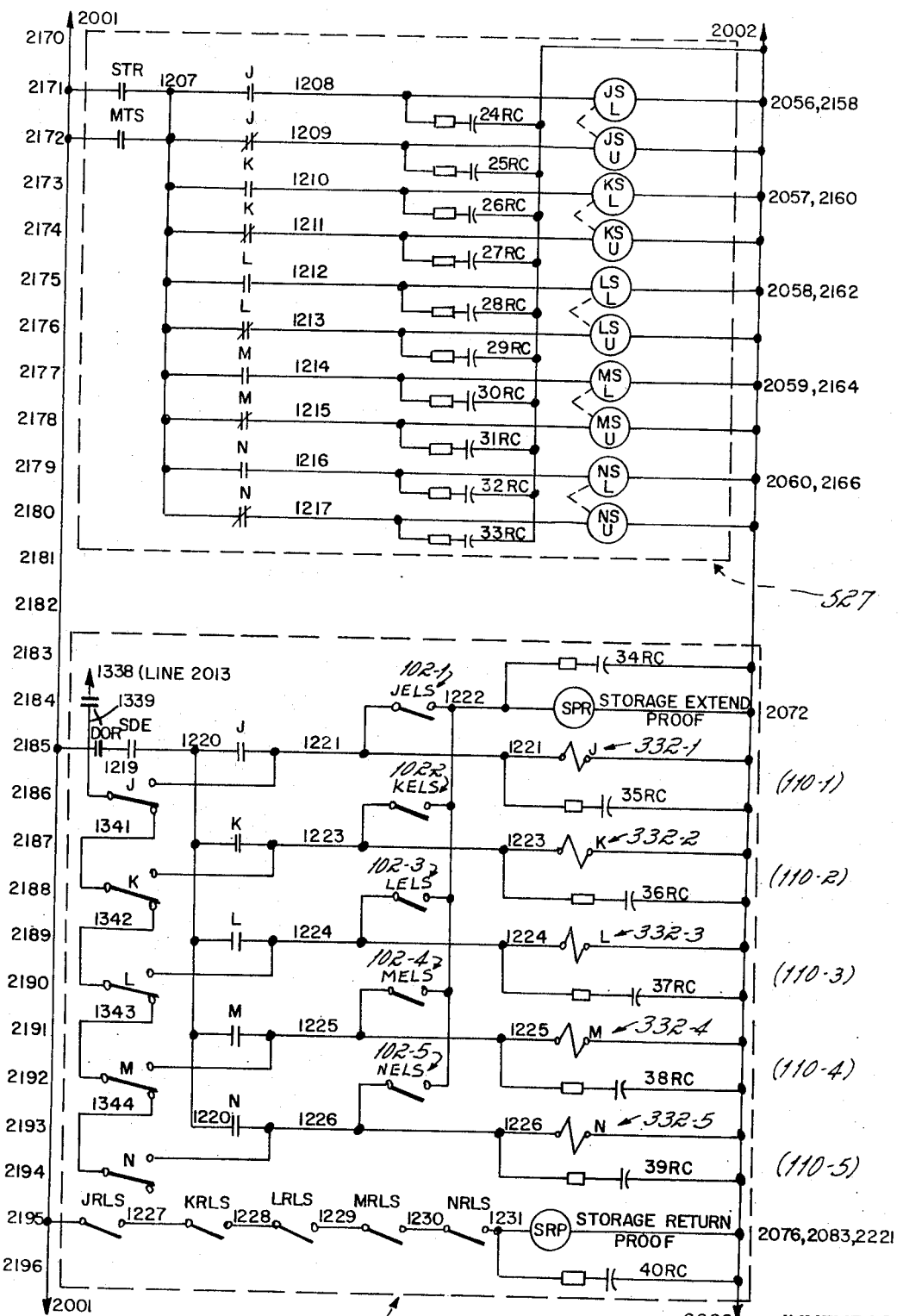
Figure 33:
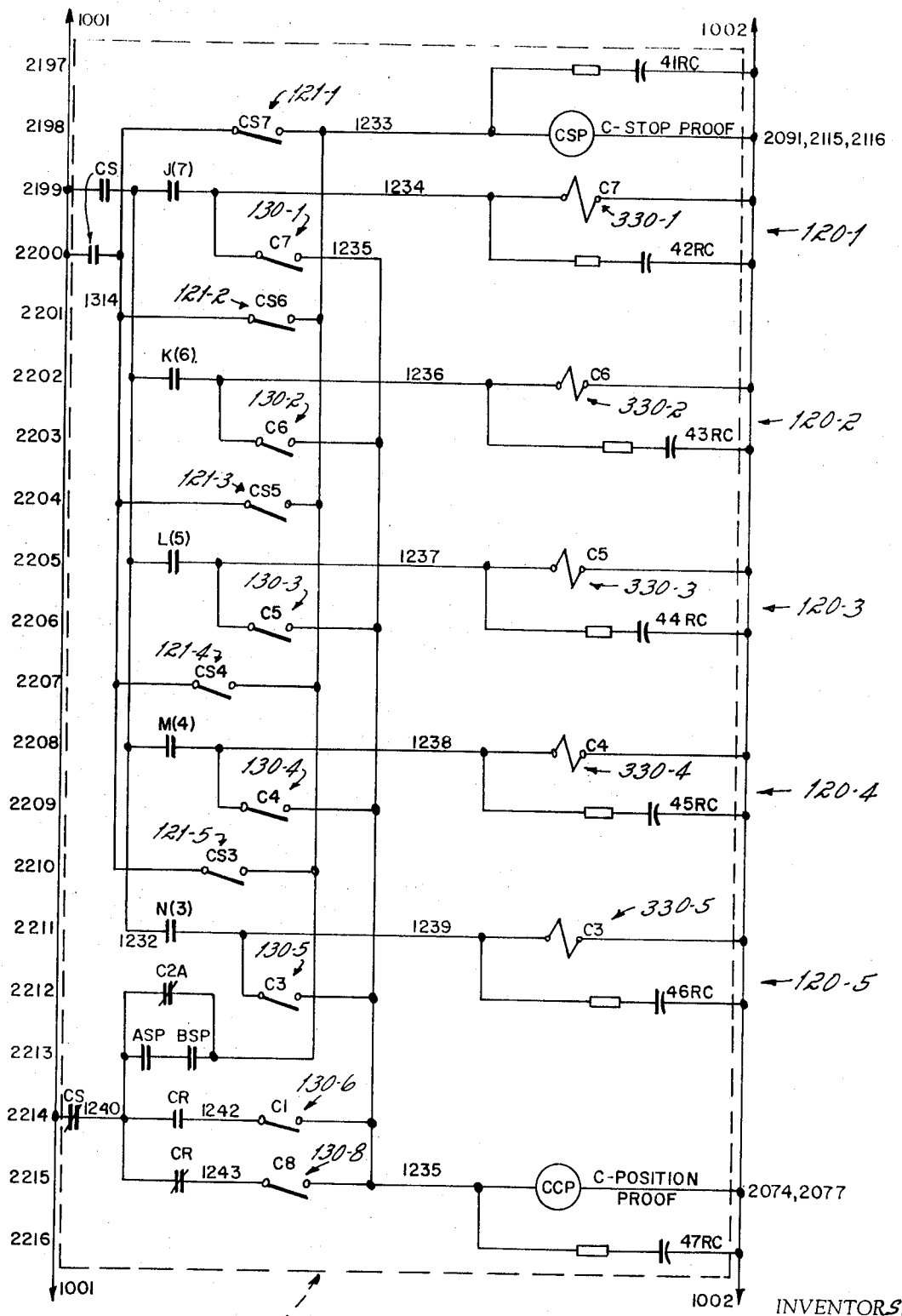
Figure 34:
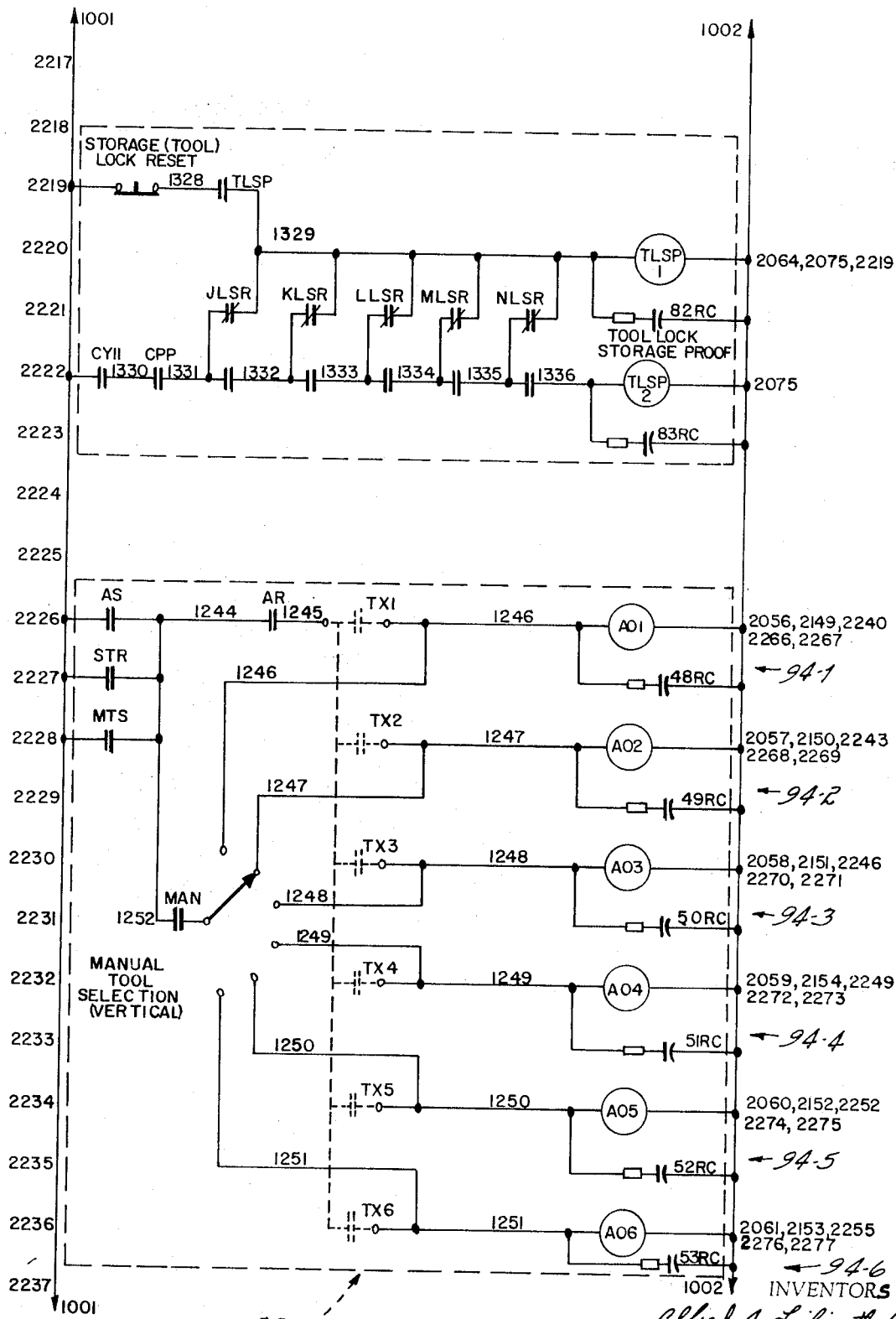
Figure 35:
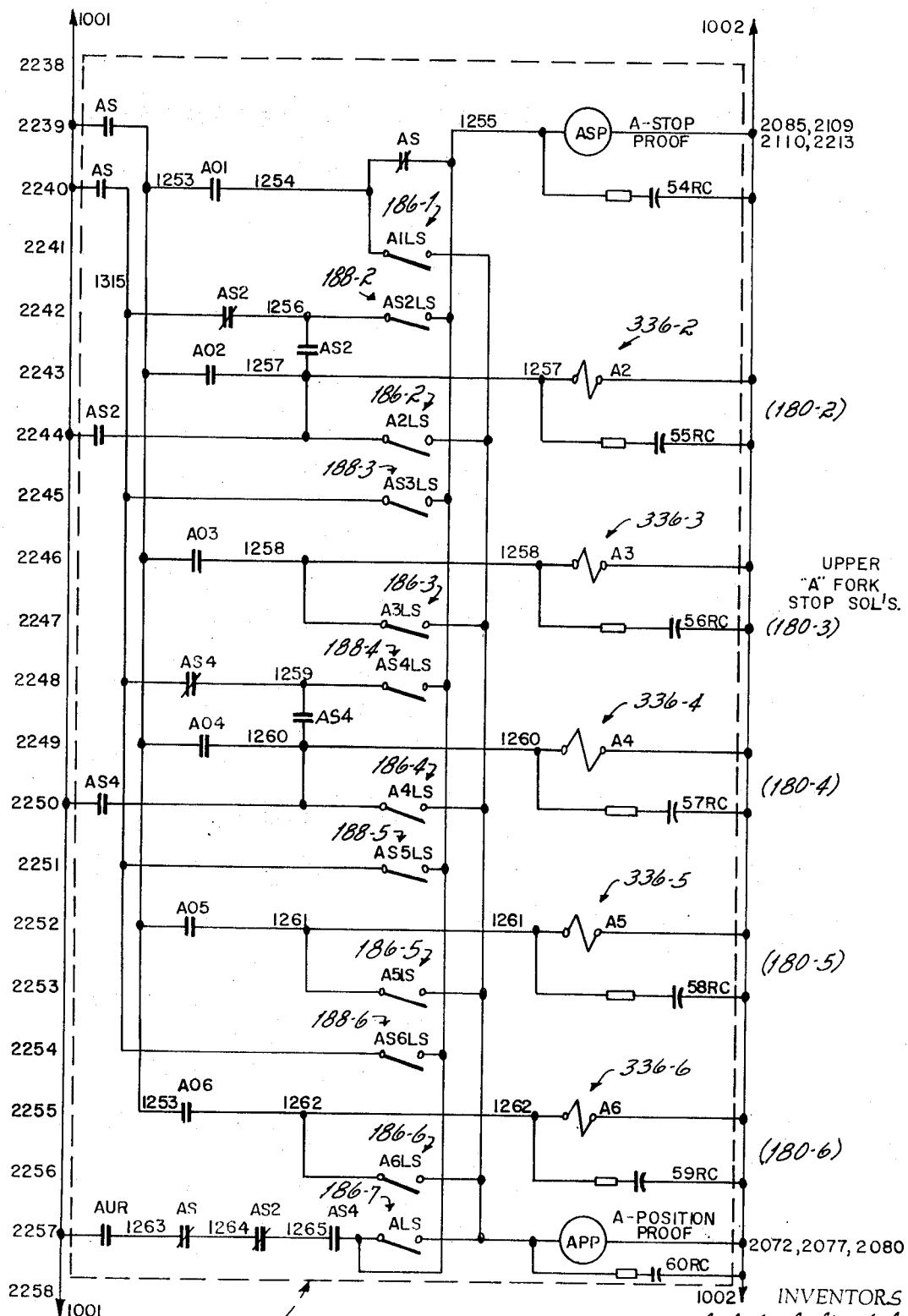
Figure 36:
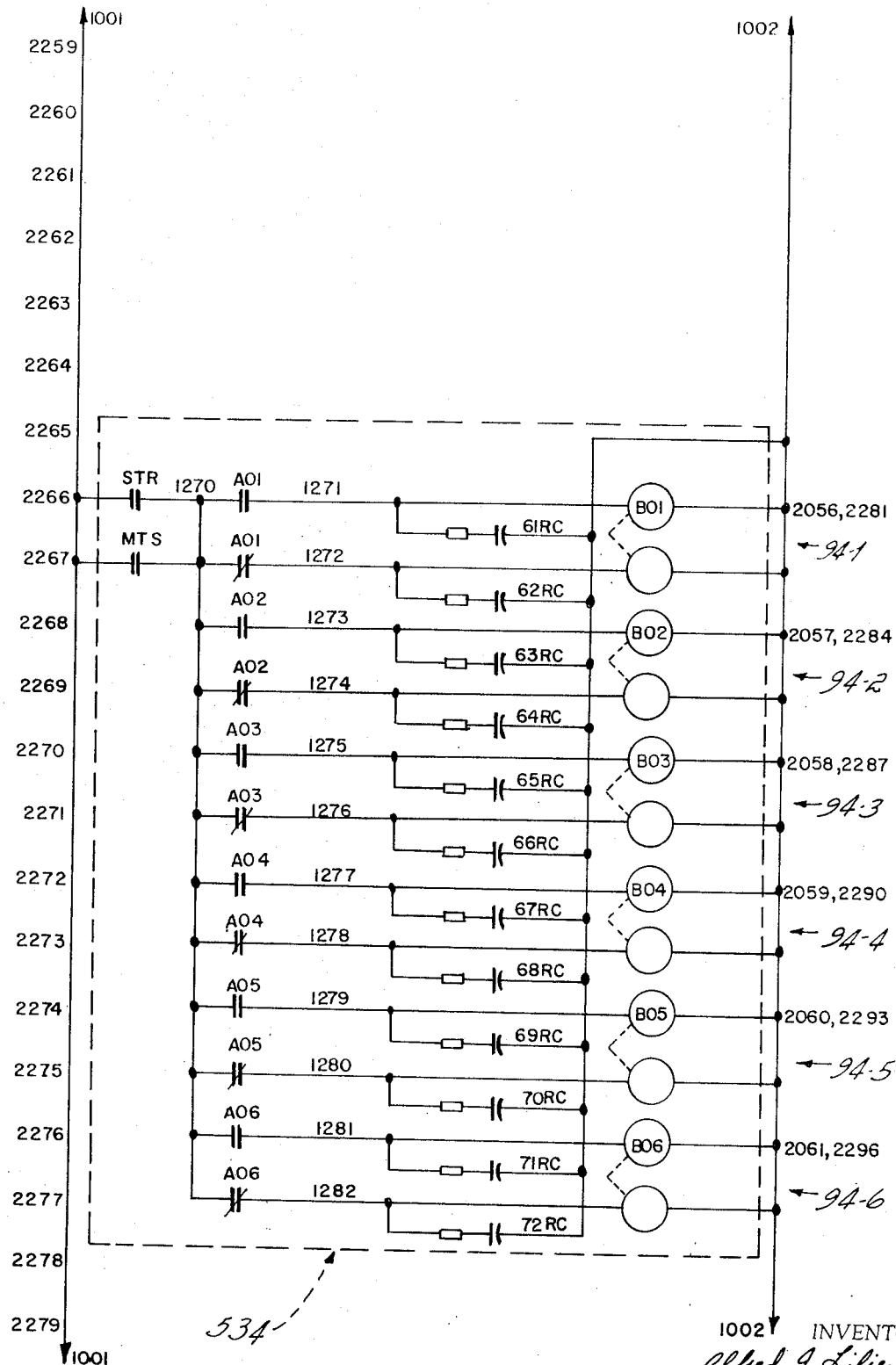
Figure 37:
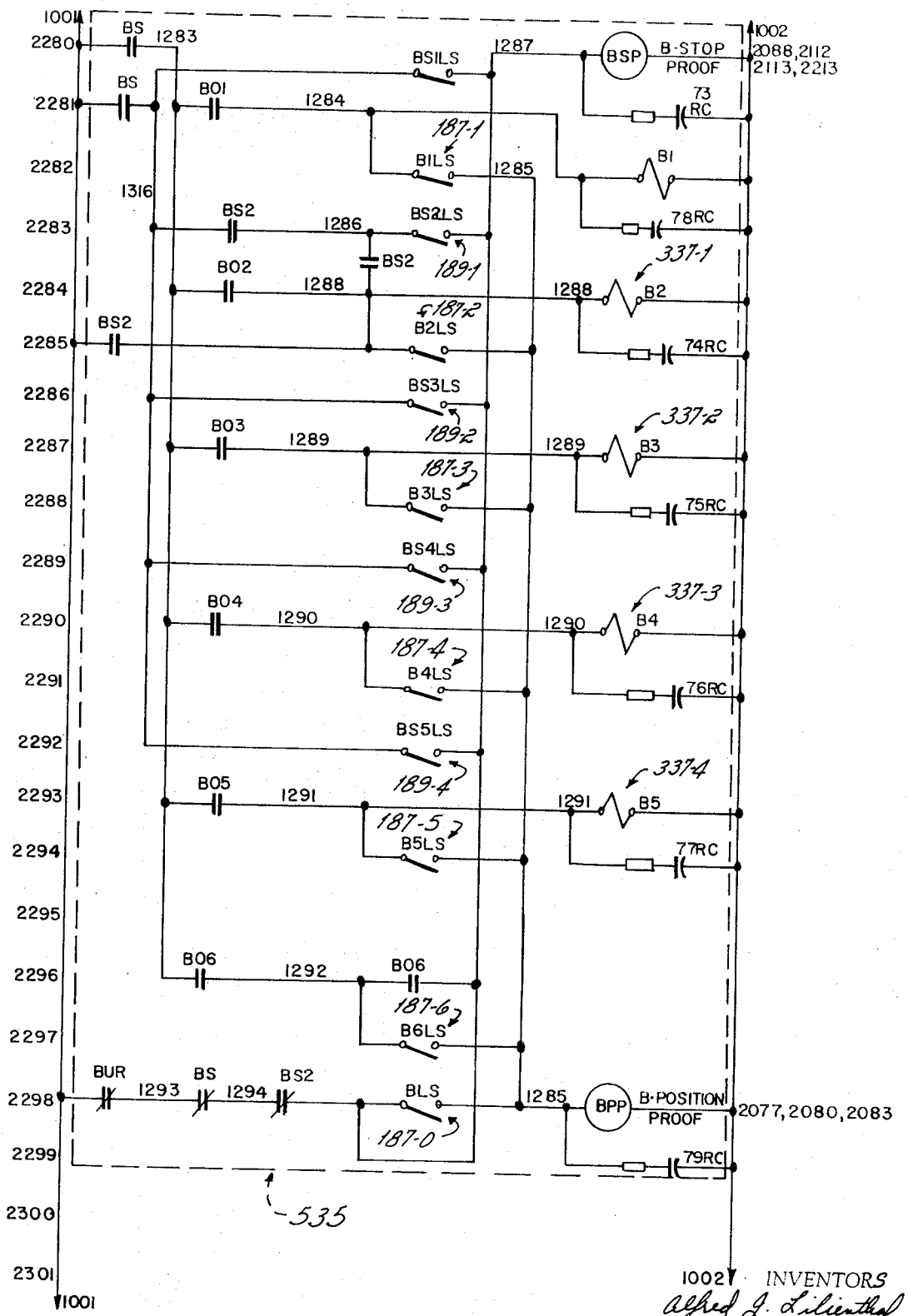
Figure 38:
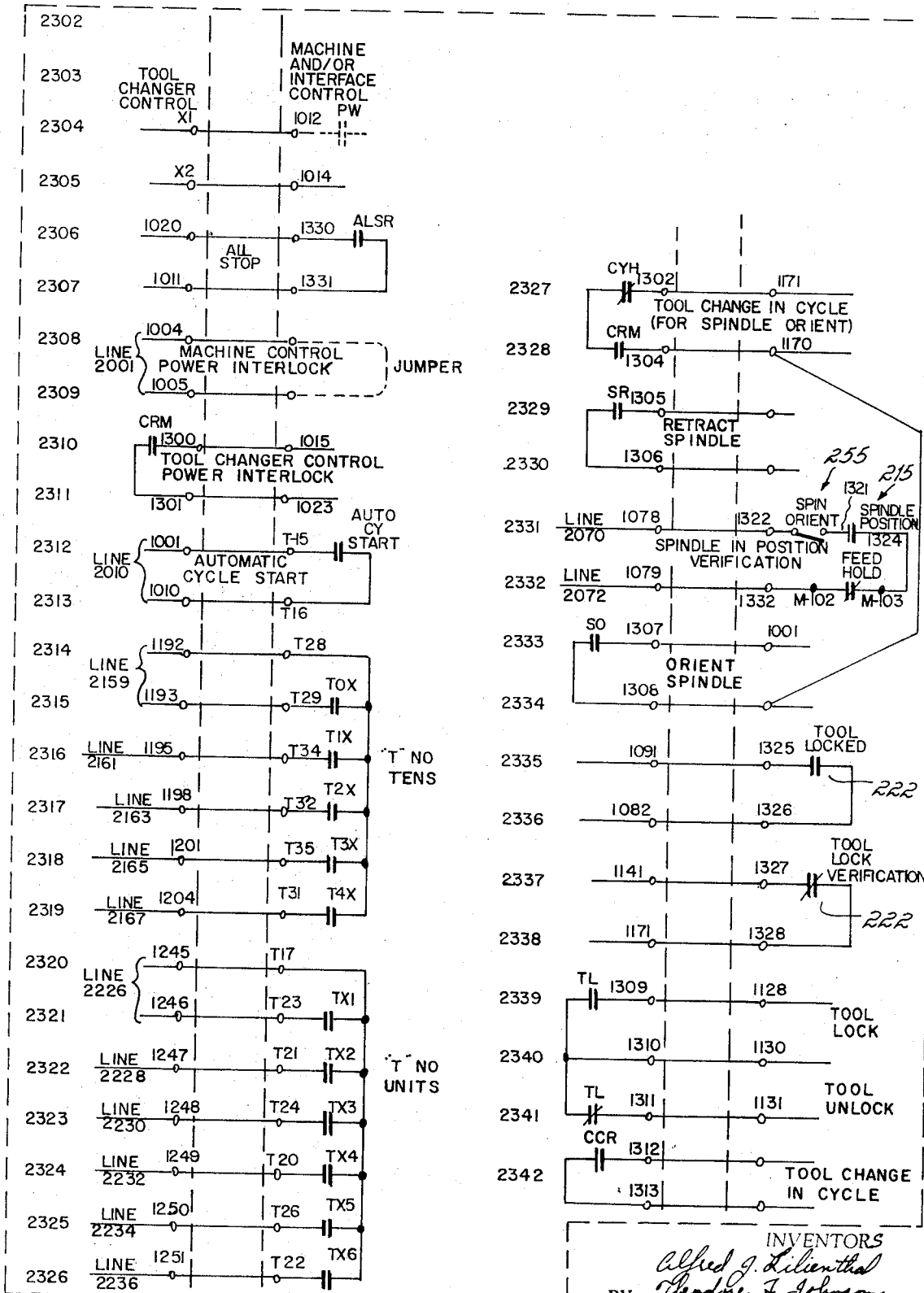

Referring first to the diagram beginning with FIG. 25, the controls operate from a conventional a.c. power source 500. A master control relay CRM is provided in the safety interlock circuit of line 2003. The winding of the relay CRM is connected in series with various interlock circuits 501 of the machine, and with a hydraulic pressure safety switch 1PS. The opening of any one of the switches in the circuit 2003 will de-energize the relay CRM breaking the contacts of the relay, some of which are illustrated in line 2005, disconnecting the control circuitry of the machine to prevent its further operation.

Various options are provided such as provision for manual tool loading of the matrix which is selectable by a switch 502 in line 2012, and for manual tool change selectable by a switch 503 in line 2014. The manual controls are shown in the drawings and their operation can be understood from the description of the operations which they can control in conjunction with the automatic operation of the tool changer.

The command signals and tool selection signals for automatic operation are generally derived from the machine tool controls as illustrated by the typical interface circuit 540 beginning at line 2302 of the diagram. This circuit also links with machine tool condition verification circuits used by the tool changer controls such as those containing spindle axial position limit switch 215, the spindle orient limit switch 255 and the tool lock limit switch 222 shown in the diagram beginning at line 2331.

The automatic controlling of the tool change operation is provided through a cycle control circuit 505, beginning at line 2030, which operates through a power supply 506 which is connected as shown beginning at line 2019 in the diagrams. The cycle control circuit 505 includes a stepper relay 507 which sequentially energizes the cycle step control circuits 1024 through 1037. The stepping of the relay 507 is achieved, after the completion of each step of a tool change cycle, by a closed loop feedback circuit 508, beginning at line 2068 of the diagram. These circuits 508 include the stepper relay drive 507 which steps the relay after each step of the cycle and which resets the relay to its initial condition, closing circuit 1024, after the completion of the last step of the cycle.

Several limit switches or proof switches are provided through the machine and these are generally shown in the circuit diagram, and are referred to in the operational discussions of this specification. These switches verify that all preceding operations have been performed properly. Generally, these switches are wired into the control circuitry to prevent the next programmed operation to occur, as for example, wired into the feedback circuits which step the relay 507.

A read-out panel 510 is also provided, illustrated at line 2049 and connected through power supply 511 at line 2047, to monitor the progress of a tool change operation, and to display identification of the tools involved in the tool change together with a display of any major abnormal conditions incurred during a tool change operation.

The solenoid valves which operate the upper and lower fork drive cylinders 148 and 149, the carriage drive cylinder 107, and the frame drive cylinders 88 and 91 are controlled through drive solenoid control circuits 513, illustrated beginning at line 2085 of the diagram. The windings of these solenoids are associated with the respective valve solenoids of FIG. 24. These circuits are selectively energized by the cycle control circuit 505 to which they are connected through the diode matrix 515 which is illustrated beginning at line 2105 of the diagram.

Selection of a new tool, either manually or automatically such as through the program of the numerically controlled tool changer interfaced through the circuit 540, results in the addressing of one of the drawers 24–1 through 24–5 containing the compartment which carries the selected tool. This addressing is accomplished through the column selecting circuits 520 illustrated beginning at line 2156 of the diagram. These circuits 520 supply information to energize the cylinder 120 of the proper carriage stop 118, and to energize the corresponding drawer cylinder 100 of the addressed drawer 24. This information is supplied through the carriage stop control circuit 521, beginning at line 2197, and the storage drawer circuit 522, beginning at line 2183, respectively. The circuit 520 also stores this information through the circuit 527, beginning at line 2171, for use in returning the tool to the same compartment in the next tool change cycle. Addressing of the storage compartment of the old tool is achieved by extracting information from the circuit 527 through the circuit 520. The circuits 521 and 522 are connected through the diode matrix 515 to the cycle control circuit 505 to energize the cylinders 120 and 100 during the appropriate steps of the tool change cycle. In the stop control circuit 521, the limit switches, which include the carriage stop limit switches 121–1 through 121–5, the carriage position limit switches 130–1 through 130–5, and the carriage position limit switches 130–0 and 130–8, monitor the accomplishment of the programmed motions which are to occur within the step of a tool change cycle to control the sequencing of various sub-steps within each step of each cycle. The drawer limit switches 102–1 through 102–5 seve a similar purpose in the drawer control circuit 522. Other such switches, such as switches 269, are provided to insure that tools are either firmly seated or completely withdrawn from the compartments of the storage magazine. These switches 269 are connected in a monitor circuit 524 beginning at line 2098 of the diagram, which is connected to the manually resettable interrupt circuit beginning at line 2219. Also provided are the frame position limit switches 95–1, –2 and –3 shown in lines 2083, 2077 and 2079 respectively of the diagram.

The controls for positioning the upper and lower tool forks 28 and 29 are essentially identical to the positioning controls for positioning the carriage 25. The controls for the upper tool fork 28, which always transports the new tool, are similar to the circuitry for positioning the carriage at the compartment of the new tool, while the controls for the lower tool fork 29 are similar to the circuitry for the positioning of the carriage adjacent the magazine and returning the old tool. In this respect, the fork positioning circuit 530 is similar to the carriage positioning circuit 520 while the circuit 534 serves to store and retrieve the old tool storage location in a manner similar to that of circuit 527. The row selection circuit 530 illustrated beginning at line 2224 of the diagram operates, in selection of a new tool, to decode a tool selection signal from the interface circuit 540 and to energize an appropriate one of the upper fork stop circuits 531 which are illustrated beginning at line 2239 of the diagram. In storing an old tool, the circuit 530 operates to transmit the old tool identification information from the storage circuit 534 illustrated beginning at line 2265 of the diagram to the lower fork stop circuit 535 illustrated beginning at line 2280.

The circuit 528 illustrated beginning at line 2146 of the diagram shows the connection of the limit switches 130–6 and 130–7 which bracket the region of vertical travel of the forks up and down the carriage during transport of tools between the magazine and the spindle. This region is provided to insure that the forks 28 and 29 will be in rectilinear movement in the lateral direction only when the forks are near the magazine or the spindle where engaging or disengaging of tools, which requires such motion, takes place.

OPERATION IN DETAIL

Presented here is a detailed discussion of the procedure involved in a typical tool change cycle of operation. With a machining operation completed at the machine head 12 upon a workpiece supported upon the worksupport 13, a used tool 36 is present in the spindle 14. For purposes of example, the old tool 36 is assumed to have been removed from the storage magazine 21 in the previous tool change cycle from a compartment 23 in drawer 24–1 in horizontal row 94–3. The information for locating this compartment has been stored by the tool changer controls. The numerically controlled program of the machine tool 10 signals the commencement of a tool change operation, and further signals the location of the compartment 23 which contains the new tool 44 which is to replace the old tool 36 in the spindle. The location of the new tool 44 is assumed to be storage drawer 24–3 and horizontal row 94–5. The work support 13 proceeds to position the workpiece longitudinally and laterally while the machine head 12 together with the tool changer 20 moves vertically on the column 11 for the next machining operation.

The initial states of the tool changer components are essentially as illustrated in FIG. 4, with the hydraulic control circuitry essentially as illustrated in FIG. 24 with the following exceptions: solenoid 313 of valve 311 and solenoid 322 of valve 321 are energized to apply a constant hydraulic force into the cylinders 88 and 91 to maintain the tool changer in its rest position; the solenoid 329 of valve 327 is energized to supply a constant hydraulic force into the cylinder 107 to drive the carrige 25 to its rest position at the left of the transfer mechanism 22, solenoid 340 of valve 334 is energized to apply constant hydraulic force into the cylinder 148 to drive the upper tool fork 28 to its rest position at the top of the carriage 25; and solenoid 343 of vavle 335 is energized to apply constant hydraulic force into the cylinder 149 to maintain the lower tool fork 29 at its rest position at the lower end of the carriage 25.

The presence of the tool changer at its rest position is verified by the limit switch 95–1 while the presence of the carriage 25 at its rest position is detected by the limit switch 130–0. Similarly, the presence of the tool forks 28 and 29 at their respective rest positions is detected by the limit switches 186–7 and 187–0, respectively. Verification of the positions of the drawers 24 in their completely retracted positions is achieved through the limit switches 93, while verification that there are no loosely seated tools within the compartment 23 of the storage magazine 21 is achieved by a limit switch 269 within each compartment.

Prior to any motions of the tool changer, the spindle 14 retracts to its tool change position from the machine head 12 and this condition is verified by the closing of the limit switch 215.

Upon completion of the machining operation, a signal is generated to actuate the magnetic reed switch 243 adjacent the spindle collar 240. As the leading edge of a ferrous strip 241 or 242 on the spindle collar 240 passes the switch 243, the switch closes to de-energize the solenoid 235 of the valve 229 and to simultaneously energize the solenoid 245. This causes the valve 229 to switch to a position such that the high volume fluid must flow through the restriction valve 248 and at reduced flow to the hydraulic motor 227. This causes the motor to continue at a low speed which is maintained until the leading edge of the same ferrous strip 241 or 242 passes the second magnetic reed switch 244 to cause the reed switch 244 to actuate. Simultaneously with the actuation of reed switch 244, the trailing edge of the same strip 241 or 242 causes the reed switch 243 to de-actuate. This in turn causes the de-energizing of the solenoid 245 and the sequential energizing of the solenoid 250, so that the valve 229 blocks the pressure to the motor 227 thereby stopping the motor and the spindle rotation, the clutch 224 disengages, and the latch or shot pin 251 advance to engage one of the grooves 252 or 253 in the shaft portion 254, to precisely register the spindle at a predetermined angular orientation. This condition is verified by the limit switch 255 which is actuated by the successful registration of the plunger 251 in the notch 252 or 253.

The first motion of the tool changer is achieved by de-energizing solenoid 313 and energizing solenoid 312 tp reverse the valve 311, causing the cylinder 91 to move the tool changer against the opposing force of the cylinder 88, and to thereby extend the tool changer from its rest position to its transfer position, which is verified by the closing of the limit switch 95–2.

When all of the above prerequisite conditions for a tool change have been accomplished, the tool changer proceeds to address the storage compartment of the new tool 44, and to guide the upper tool fork 28 into engagement with the new tool.

In the first step of the tool change cycle, solenoid valve 336–5 is energized to extend the shot pin 178–5 of the stop block 176–5, which movement is verified by the limit switch 188–5. The closing of the limit switch 188–5 causes the solenoid 342 to de-energize the solenoid 342 to energize to reverse the valve 334 to cause the cylinder 148 to drive the upper fork 28 down the carriage and against the shot pin 178–5 of the stop block 176–5 to stop the fork 28 adjacent the row 94–5. Te presence of the fork 28 in the row 94–5 is verified by limit switch 186–5 which signals the end of the first step of the cycle.

In the second step of the cycle, the solenoid valve 332–3 is energized, causing the cylinder 100–3 to drive storage drawer 24–3 to its extended condition, which is verified by the closure of a limit switch 102–3. Simultaneously, solenoid valve 330–3 is energized to extend the pin 119–3 of the carriage stop 118–3, which condition is verified by limit switch 121–3, which together with verification of the extended drawer 24–3 discussed above, causes the solenoid 329 to de-energize and the solenoid 328 to energize to reverse the valve 327 and to drive the carriage 25, through cylinder 107, to the right and away from its rest position to a position against the extended shot pin 119–3, which condition is verified by the closing of the limit switch 130–3. The motion of the carriage in this second step brings the upper fork 28 into rectilinear engagement with the new tool 44 in the storage compartment 23 at row 94–5 of drawer 24–3.

As the end 207 of the latch 201 of the fork engaging means 33 (FIG. 3) contacts the drawer, the other end 206 of the latch 201 releases the pin 199 allowing it to be forced down into the notch 194 in the flange 191 of the tool holder 31 by the leaf spring 204. As the fork 28 moves into its engagement with the new tool 44, the fork 28 deflects the lever 262 causing the slide 260 of the engaging means 32 of the compartment 23 to release the tool 44 from that compartment. This releasing of the engaging means 32 of the compartment 23 is verified by the opening of the limit switch 269 within the compartment 23. The opening of the limit 269, together with the closing of the limit switch 130–3, marks the end of the second step of the cycle and initiates the third step of the cycle.

In the third step, the solenoid valve 332–3 is de-energized, causing the drawer 24–3 to retract, withdrawing the tool 44 from the compartment 23. As the drawer withdraws, the lever 262 of the storage compartment engaging means 32 is released permitting the slide 260 to move under the influence of the spring 261. If the tool 44 has successfully been removed from the compartment 23, the slide 260 will completely extend a condition which is verified by the closing of the limit switch 269 within the compartment. As the drawer 24-3 moves away from the fork 28, the lever 206 (FIG. 3) moves into the groove 205 of the pin 199 of the fork engaging means 33 to lock the tool 44 in the fork. The total retraction of the drawer 24-3 is verified by the closing of the limit switch 93-3 at the rear of the storage drawer within the magazine 21. The closing of both of the switches 93-3 and 269 signals the completion of the third step and initiates the fourth step of the tool change cycle.

In the fourth step, the solenoid 336-5 is de-energized causing the shot pin 178 of the stop block 176-5 to retract and solenoid 342 simultaneously to de-energize closing valve 334, immobilizing cylinder 148 and thereby substantially immobilizing the upper fork 28 on the carriage 25. Simultaneous with these operations, the shot pin 119-3 of the stop block 118-3 retracts, allowing the carriage 25 to move to the right under the influence of the carriage cylinder 107 which is still actuated. Solenoid 336-4 is then energized to extend the pin 178-4 of the upper fork stop block 176-4, which extension is verified by limit switch 188-4, and by the energizing of solenoid valve 337-2 to extend the pin 179-2 of the lower fork stop block 177-2 which corresponds to the row 94-2 in which the spindle 14 lies. The extension of block 177-2 is verified by the limit switch 189-2. A the carriage 25 moves to the right, the limit switch 130-6 is tripped to energize the solenoids 341 and 342 to cause the upper fork 28 to move down to row 94-4, where it is verified at that position by limit switch 186-4, and to cause the lower fork 29 to move upwardly against the stop block 177-2 adjacent row 94-2 where its position is verified by the limit switch 187-2. The positioning of the upper fork to the row 94-4 is merely to bring it into a more convenient position for a fast tool change at the spindle. Of course, had the upper fork 28 removed a tool from, for example, row 94-1 instead of row 94-5, then it would be below this position on the carriage and it would move upwardly instead of downwardly to get into position for a tool change. This logical decision as to how to energize the valve 334 is made by the control circuitry. If the positions of the tool forks 28 and 29 have been properly verified by the time the carriage 25 trips the limit switch 130-7 on its way to the spindle, the carriage will continue to be driven toward the spindle to bring the lower fork 29 into rectilinear lateral engagement with the old tool 36 within the spindle. The engaging means 33 of the fork 29 operate in the same manner as they did for fork 28 when it engaged tool 44 in second step above. When this engagement occurs, the carriage has been driven against a permanent stop block at the right of the stop transfer mechanism 22, and the carriage has tripped a limit switch 130-8 to signal the completion of the 4th step of the cycle.

At the beginning of the fifth step of the cycle, if all previous operations have been properly verified, the tool lock within the spindle releases the tool and, when this release has been verified by the de-actuation of the limit switch 222, the tool changer 20 is extended longitudinally by de-energization of the solenoid 322 and the energization of the solenoid 323 to cause the cylinder 88 to move the tool changer 20 to its change position from its transfer position, a motion which will be verified by the limit switch 95-3 which signals the end of the fifth step of the cycle.

At the beginning of the sixth step of the cycle, the solenoid valves 337-2 and 336-4 are de-energized, and the solenoid valve 336-2 is energized causing stop blocks 177-2 and 176-4 to de-actuate and the stop block 176-2 to actuate. When the limit switch 188-2 verifies the actuation of block 176-2, the solenoids 342 and 343 energize, causing both forks 28 and 29 to move downwardly, on the carriage to carry the lower tool fork 29 with the old tool 28 to the lower tool fork rest position, and to carry the upper tool fork 28 into row 94-2 against the stop block 176-2 and into axial alignment with the spindle. These conditions are verified by the actuation of the limit switches 187-0 and 186-2 respectively, to signal the end of the sixth step of the cycle.

In the seventh step of the cycle, when all previous motions have been properly verified, the solenoid 322 is energized and the solenoid 323 is de-energized to cause the valve 321 to reverse, and the cylinder 88 to extend to move the tool changer from its change position to its transfer position in which the end of the piston rod 92 of the cylinder 91 is in abutment with the bracket 90 of the tool changer mount 77, a condition which is verified by limit switch 95-2. This motion inserts the new tool held by the fork 28 into the spindle 14, and releases the fork engaging means 33 as the lever end 207 contacts the spindle.

In the eighth step the tool lock is actuated to securely lock the new tool 44 within the spindle 14, a condition which is verified by the limit switch 222 within the spindle 14.

In the next steps of the cycle, for returning the tool to storage, the storage drawer 24-1 and the horizontal row 94-3 which contain the compartment 23 to which the old tool 36 has been assigned, are addressed.

As step 9 commences, solenoid valve 330-1 is energized, causing actuation of the stop block 118-1 which motion is verified by limit switch 330-1. When this motion is verified, the solenoid 328 is de-energized and solenoid 329 is energized causing the valve 327 to reverse to move the carriage to the left under the action of the cylinder 107. This motion causes the tool fork 28 to disengage the new tool 4 and leave it firmly seated within the spindle 14. 44

As the carriage proceeds to the left, the limit switch 130-7 is tripped causing the solenoid valve 336-2 to de-energize and the solenoid valve 337-3 to energize, which in turn causes de-actuation of the upper fork stop block 176-2 and actuation of the lower fork stop block 117-3. Actuation of stop block 177-3 is verified by the limit switch 189-3 which enables the solenoid valves 341 and 340 to energize, causing both forks to move upwardly on the carriage 25. The upper fork 28 moves against the fixed stop 184 at the top of the carriage and is so verified by the limit switch 186-7, and the lower fork 29 moves upwardly against the actuated stop block 177-2 and is so verified by limit switch 187-2. The carriage continues to move to the left if all of the motions have been verified by the time the carriage reaches the limit switch 130-6. The carriage 25 is finally driven against the extended pin 119-1 of the stop block 118-1 to stop the carriage adjacent the drawer 24-1 and is so verified in this position by the limit switch 130-1. The closing of the limit switch 130-1 signals the end of the 9th cycle.

In the 10th cycle, with lower tool fork 29 now holding the old tool 36 in axial alignment with the compartment 23 of row 94–3 of drawer 24–1, the drawer 24–1 is extended through energizing of the solenid valve 332–1. The extension of the drawer is verified by limit switch 102–1. As the drawer extends, the knobbed end of the shank 211 of the old tool cams the slide 260 of the engaging means 32 out of the compartment bore, while the fork 28 cams the lever 262 to also urge and thereafter retain the slide 260 out of locking engagement with the tool 36. The face of the drawer also releases the fork engaging means 33 by contacting the end 207 of the lever 206.

The 11th step of the cycle commences with the withdrawal of the pin 119–1 of the carriage stop 118–1 through a de-energizing of the solenid 330–1. This allows the cylinder 107 which is still under pressure to move the carriage 25 to the left toward its rest position, and to cause the lower fork 29 to rectilinearly withdraw in the lateral direction from the tool 36. The withdrawal of the fork 28 releases the lever 262 and allows the slide 260 of the storage compartment engaging means 32 to lock the tool within the compartment, and this locking condition is verified by the limit switch 269 within the compartment. The carriage continues to move to the left until a permanent stop at the end of the transfer mechanism has been engaged and the rest position of the carriage is verified by the limit switch 130–0.

In step 12, the final step of the cycle, the drawer 24–1 is retracted fully within the magazine 21 by a de-energizing of the solenoid valve 332–1, and the retracted condition of the drawer is verified by a limit switch 93–1 at the rear of the drawer. Furthermore, the solenoid 337–2 is de-energized to retract the pin 179–2 of the stop 177–2. The solenoid 341 si de-energized and the solenoid 343 of the valve 335 is energized to cause the valve 335 to reverse to drive the fork 29 to the lower end of the carriage 25, which condition is verified by the limit switch 187–0 on the transfer mechanism 22. The solenoid 312 is de-energized and the solenoid 313 is energized to cause the valve 311 to reverse, reversing the action of cylinder 91, causing its piston rod 92 of the cylinder 91 to fully retract and allowing the piston rod 89 of the cylinder 88 to move the tool changer 20 to its fully retracted rest condition, which position is verified by the limit switch 95–1. At this point, the address of the new tool 44 is stored to become the address of the old tool during the next tool change cycle, when it will be desired to return the tool 44 to its original assigned compartment 23 within the magazine 21.

At the end of the tool change cycle, the conditions are essentially the same as they are initially with the tool changer 20, the carriage 25, and the upper and lower tool forks 28 and 29 being constantly urged to their rest positions.

While we have described only a single preferred embodiment of our invention, those persons skilled in the tool changer arts will readily appreciate numerous changes and modifications which may be made without departing from the spirit of our invention. Specifically, it will readily be apparent that while we have described the tool changer as being embodied on a horizontal boring mill it is equally adaptable to a vertical boring mill by changing the orientation of the complete tool changer 90°. Additionally, we have described the tool changer magazine as being vertically movable with the tool head. It will readily be appreciated, though, that the magazine could be fixedly mounted beside the machine and the tool forks utilized to transport the tools to the vertical level of the tool spindle for a tool change operation. Other modifications will be appreciated by those persons skilled in the art. Therefore, we do not intend to be limited except by the scope of the amended claims.

Having described our invention, we claim:

1. A tool changer for transporting interchangeable tools between a tool storage matrix and a tool machining support at a machining area of a machine tool, said tool changer being operable in a combination of rectilinear movements to effect a tool interchange, said tool changer comprising:
   a carrier member relatively movable in a rectilinear path between a transfer area adjacent said storage matrix and said machining area;
   a tool handling member relatively movable on said carrier in a rectilinear path perpendicular to said path of said carrier;
   a tool storage support relatively movable between said transfer area and said storage matrix in a rectilinear path perpendicular to the paths of said members;
   said tool machining support being relatively movable to and from the paths of said members in a rectilinear path parallel to the path of said storage support; and
   control means operable associated with each of said movements for causing the transfer of a tool between said storage matrix and said tool machining support exclusively by combinations of said movements.

2. A tool changer according to claim 1 further comprising:
   a plurality of storage compartments at said storage matrix, said compartments being positioned adjacent different points along said paths of said members; and
   said control means being operative to position said handling member adjacent a selected one of said compartments by said movements of said members.

3. A tool changer according to claim 2 wherein:
   said selected one of said compartments is carried by said tool storage support; and
   said control means is operable for causing the transferring of a tool between said selected one of said compartments and said tool handling member by the movements of said members and said support.

4. A tool changer according to claim 2 further comprising:
   a plurality of tool storage supports including said tool storage support, and each of said storage supports being relatively movable between said transfer area and said storage area in rectilinear path perpendicular to the paths of said members;
   at least one of said tool storage compartments being carried by each of said supports; and
   said control means being operable for transferring a tool between said selected compartment and said tool handling member by the movements of said members and the one of said supports carrying said selected compartment.

5. A tool changer according to claim 4 wherein:
   each of said supports carries a plurality of said compartments.

6. A tool changer according to claim 5 wherein:

the movement of one of said members positions said handling member adjacent the one of said supports carrying said selected compartment and the movement of the other of said members positions said handling member adjacent said selected compartment of said one of said supports.

7. A tool changer according to claim 6 wherein:
the movement of said carrier member positions said handling member adjacent said one of said supports and the movement of said handling member positions said handling member adjacent said selected compartment of said one of said supports.

8. A tool changer according to claim 2 for transporting a tool from said selected compartment at said storage matrix to said tool machining support wherein:
said control means is further operative to sequentially effect the transport of a tool from said storage matrix to said transfer area by the movement of said support, and then to effect the transport of said tool from said transfer area to a point adjacent said tool machining support by the combined movements of said members, and then to effect the transfer of said tool to said tool machining support.

9. A tool changer according to claim 2 for transferring a tool from said tool machining support to said selected compartment at said storage matrix wherein:
said control means is further operative to sequentially effect the transfer of a tool from said tool machining support to a point adjacent said tool machining support, and then to effect the transport of said tool from said point to said transfer area by the combined movements of said members, and then to effect the transport of said tool from said transfer area to said selected compartment at said storage matrix by the movement of said tool storage support.

10. A tool changer according to claim 2 for transporting a tool between a selected compartment at said storage matrix and said tool machining support wherein:
said control means is further operative for sequentially causing the transporting of a tool from said storage area to said transfer area by the movement of said tool storage support, and then for causing the transporting of said tool from said transfer area to a point adjacent said tool machining support by the combined movements of said members, and then for causing the transferring of said tool to said tool machining support; and
said control means is further operative for causing a transferring of a tool from said tool machining support to a point adjacent said tool machining support, and then for causing the transporting of said tool from said point to said transfer area by the combined movements of said members, and then for causing the transporting of said tool from said transfer area to said selected compartment at said storage matrix by the movement of said tool storage support.

11. A tool changer according to claim 1 for transporting a tool from said storage matrix to said machining support wherein:
said control means is further operative to effect the transporting of a tool from said storage matrix to said transfer area by the movement of said tool storage support, and then for causing the transporting of said tool from said transfer area to a point adjacent said tool machining support by the combined movements of said members, and then for causing the transferring of said tool to said tool machining support.

12. A tool changer according to claim 2 for transferring a tool from said tool machining support to said storage matrix wherein:
said control means is further operative to effect a transfer of a tool from said tool machining support to a point adjacent said tool machining support, and then to effect the transport of said tool from said point to said transfer area by the combined movements of said members, and then to effect the transport of said tool from said transfer area to said storage matrix by the movement of said tool storage support.

13. A tool changer according to claim 1 for transporting a tool between said storage matrix and said tool machining support wherein:
said control means is further operative to cause the transport of a tool from said storage matrix to said transfer area by the movement of said tool storage support, and then for causing the transport of said tool from said transfer area to a point adjacent said tool machining support by the combined movements of said members, and then for causing the transferring of said tool to said tool machining support; and
said control means is further operative to cause a transfer of said tool from said tool machining support to a point adjacent said tool machining support, and then to cause the transport of said tool from said point to said transfer area by the combined movements of said members, and then to cause the transport of said tool from said transfer area to said storage matrix by the movement of said support.

14. A tool changer according to claim 2 wherein:
said compartments are disposed in a rectangular array.

15. A tool changer according to claim 14 wherein:
the movement of one of said members positions said handling member adjacent the one of said supports carrying said selected compartment and the movement of the other of said members positions said handling member adjacent said selected compartment of said one of said supports.

16. A tool changer according to claim 2 further comprising:
a plurality of stops for stopping said handling member adjacent said selected compartment, each of said stops corresponding to different points in the paths of said members, said stops being selectively actuatable to stop a member at one of said points in its path.

17. A tool changer according to claim 16 wherein:
said stops are selectively actuatable to stop both of said members.

18. A tool changer according to claim 16 wherein:
a different set of said stops is associated with each of said members, the stops of each set being selectively actuable to stop the associated member.

19. A tool changer according to claim 18 wherein:
said compartments are disposed in a rectangular array with mutually perpendicular rows parallel to the paths of different members; and said different sets of stops are selectively actuable to stop the associated member in its respective path adjacent one of the perpendicular rows.

20. A tool changer according to claim 18 further comprising:
a plurality of tool storage supports including said tool storage support, each of said storage supports being relatively movable between said transfer area and said storage area in a rectilinear path perpendicular to the paths of said members;
each of said supports carrying a plurality of said compartments;
said control means being operable for transferring a tool between said selected compartment and said tool handling member by the movements of said members and the one of said supports carrying said selected compartment; and
the movement of said carrier member positioning said handling member adjacent said one of said supports and the movement of said handling member positioning said handling member adjacent said selected compartment of said one of said supports.

21. A tool changer according to claim 1 further comprising:
engaging means for the engaging of a tool by said handling member, said engaging means being actuable by the movement of said handling member relative to said tool.

22. A tool changer according to claim 1 further comprising:
engaging means for the engaging of a tool by said storage support, said engaging means being actuable by the movement of said support relative to said tool.

23. A tool changer according to claim 1 further comprising:
handling member engaging means for the engaging of a tool by said handling member;
support member engaging means for the engaging of a tool by said support; and
both said engaging means being actuable upon the movements of said members and said support.

24. A tool changer according to claim 23 for transporting a tool from said storage matrix to said machining support further comprising;
said control means being further operative for causing:
the transporting of a tool from said storage area to said transfer area by the movement of said support,
the transferring of said tool from said support to said tool handling member by the movements of said members and said support,
then the transporting of said tool from said transfer area to a point adjacent said machining support by the combined movements of said members,
and then the transferring of said tool to said machining support.

25. A tool changer according to claim 23 for transferring a tool from said machining support to said storage matrix further comprising:
said control means being further operative for causing:
transferring of a tool from said machining support to a point adjacent said machining support,
then the transporting of said tool from said point to said transfer area by the combined movements of said members,
the transferring of said tool from said tool handling member to said support by the movements of said members and said support,
and then the transporting of said tool from said transfer area to said storage matrix by the movement of said support.

26. A tool changer according to claim 23 for transporting a tool between said storage matrix and said machining support further comprising:
said control means being further operative for causing:
the transporting of a tool from said storage matrix to said transfer area by the movement of said support, the transferring of said tool from said support to said tool handling member by the novement of said members and said support, and then the transporting of said tool from said transfer area to point adjacent said machining support by the combined movements of said members, and then the transferring of said tool to said machining support; and
a transferring of a tool from said machining support to a point adjacent said machining support, and then the transporting of said tool from said point to said transfer area by the combined movements of said members, the transferring of said tool from said tool handling support by the movements of said members and said support, and then the transporting of said tool from said transfer area to said storage matrix by the movement of said support.

27. A tool changer according to claim 23 further comprising:
a plurality of tool storage supports including said tool storage supports, each of said storage supports being relatively movable between said transfer area and said storage area in a rectilinear path perpendicular to the paths of said members;
a plurality of storage compartments carried by each of said supports, said compartments positioned adjacent different points along said paths of said members;
said control means being operative to position said handling member adjacent a selected one of said compartments by said movements of said members.

28. A tool changer according to claim 27 wherein:
the movement of one of said members positions said handling member adjacent the one of said supports carrying said selected compartment and the movement of the other of said members positions said handling member adjacent said selected compartment of said one of said supportz.

29. A tool changer according to claim 28 wherein:
the movement of said carrier member positions said handling member adjacent said one of said supports and the movement of said handling member positions said handling member adjacent said selected compartment of said one of said supports.

30. A tool changer according to claim 1 further comprising:
a second tool handling member relatively movable on said carrier in a rectilinear path parallel to said path of said first tool handling member.

31. A tool changer according to claim 30 wherein:
one of said tool handling members carries a tool exclusively from said transfer area to said machining area, and the other said members carries a tool exclusively from said machining area to said transfer area.

32. A tool changer according to claim 31 further comprising:
engaging means carried by each of said tool handling members, said engaging means being operable by the relative movements of said handling members relative to a tool.

33. A tool changer according to claim 26 further comprising:
a second tool handling member relatively movable on said carrier in a rectilinear path parallel to said path of said first tool handling member;
one of said tool handling members carries a tool exclusively from said transfer area to said machining area, and the other said members carries a tool exclusively from said machining area to said transfer area; and
engaging means carried by each of said tool handling members, said engaging means being operable by the relative movements of said handling members relative to a tool.

34. A tool changer according to claim 13 further comprising:
a second tool handling member relatively movable on said carrier in a rectilinear path parallel to said path of said first tool handling member; and
one of said tool handling members carries a tool exclusively from said transfer area to said machining area, and the other said members carries a tool exclusively from said machining area to said transfer area.

35. A tool changer according to claim 31 further comprising:
a plurality of tool storage compartments at said storage matrix; and
two sets of selectively actuatable stops, one set associated with each of said tool handling members for stopping either of said members adjacent any of said compartments.

36. A tool changer according to claim 35 further comprising:
said storage compartments being disposed in a rectangular array;
means for driving one of said tool handling members along said carrier and against an actuated stop of the associated set of stops for positioning said tool handling members adjacent the first row of a selected compartment;
a third set of stops actuatable for stopping said carrier; and
means for driving said carrier against an actuated stop of said third set for positioning said tool handling member in a second row perpendicular to said first row;
both of said driving means positioning said tool handling member adjacent said selected compartment.

37. A tool changer according to claim 35 wherein:
one of said tool handling members carries a tool exclusively from said transfer area to said machining area, and the other of said members carries a tool exclusively from said machining area to said transfer area.

38. In a tool changer for use with a machine tool,
wherein said machine tool includes a work support for supporting a workpiece, a machining support for supporting a tool in a machining operation upon said workpiece, and power drive means for imparting relative movement between said tool and said workpiece during said machining operation, and
wherein said tool changer includes a tool storage magazine for storing a plurality of tools therein, and a linearly movable tool transporting member movable in a straight line path of movement between said storage magazine and said machining support for transporting tools therebetween;
a plurality of linearly movable tool supports slideable mounted to said storage magazine, each of said supports having a plurality of tool storage compartments carried thereby, each of said supports being selectively slideable in a straight line path of movement between a retracted position at a storage area for tool storage and an extended position at a transfer area for transfer of a tool between said tool transporting member and a compartment of said extended support, each of said supports being movable between said retracted position and said extended position independently of any movement of said magazine, said storage area being located near said magazine and said transfer area being located remote from said magazine.

39. The improvement according to claim 38 wherein said transporting member includes a tool handling member relatively movable in a path perpendicular to the movement of said supports; and
said tool handling member is movable to a plurality of points, one adjacent each of said compartments.

40. The improvements according to claim 39 wherein:
said compartments are disposed in a rectangular array within said storage magazine.

41. The improvement according to claim 39 wherein:
said tool transporting member includes a tool carrier member; moveable in a path perpendicular to the movement of said support;
said tool handling member is supported on said tool carrier member and moveable thereon in a path different from the path of said carrier member; and
said tool handling member is moveable to said points by combinations of the movements of said tool handling member and said tool carrier member.

42. The improvement according to claim 41 wherein:
the movement along one of said paths is effective to move said tool handling member between points adjacent the different supports, and the movement along the other of said paths is effective to move the tool handling member between points adjacent the different compartments of said supports.

43. The improvement according to claim 42 wherein:
the movement of said tool carrier member is effective to move said tool handling member to points adjacent the different supports, and the movement of said tool handling member is effective to move tools between the different compartments of said supports.

44. The improvement according to claim 42, wherein:
said compartments are disposed in a rectangular array and the path of said tool handling member is perpendicular to the path of the tool transporting member.

45. The improvement according to claim 32 further comprising:
tool engaging means carried by said tool handling member and responsive to the relative movement of said tool handling member; and
tool engaging means carried by said supports and responsive to the movement of said supports.

46. The improvement according to claim 45 wherein:
said tool handling member engaging means is responsive to the movement of said tool transporting member.

47. The improvement according to claim 46 wherein:
the movement of said tool handling member is perpendicular to the movement of tool transporting member and the storage compartments are disposed in a rectangular array within said storage magazine.

48. The improvement according to claim 42 further comprising:
tool engaging means carried by said tool handling member and responsive to the relative movement of said tool handling member; and
tool engaging means carried by said supports and responsive to the movement of said supports; and
a plurality of selectively actuable stops including a first set of stops disposed at different points along one of said paths adjacent each of said supports, and a second set of stops disposed at different points along the other of said paths adjacent the different compartments of said supports.

49. The improvement according to claim 48 wherein:
said paths are mutually perpendicular, and the compartments of the storage magazine are disposed in a rectangular array.

50. The improvement according to claim 49 wherein:
the movement of said tool carrier member moves said tool handling member between points adjacent compartments of different supports.

51. The improvement according to claim 50 further comprising:
tool engaging means carried by said tool handling member and responsive to the relative movement of said tool handling member; and
tool engaging means carried by said supports and responsive to the movement of said supports.

52. In a tool changer for use with a machine tool, wherein said machine tool includes a work support for supporting a workpiece, a machining support for supporting a tool in a machining operation upon said workpiece, and power drive means for imparting relative movement between said tool and said workpiece in said machining operation, and wherein said tool changer includes a tool storage magazine having a plurality of tool storage compartments therein and a tool transporting member movable between said storage magazine and said machining support for transporting tools therebetween;
the improvement comprising:
a tool handling member;
means for moving said tool handling member relative to said storage magazine in any one of a plurality of paths, each of said paths passing a different combination of more than one of said storage compartments and defining a plurality of different tool transfer points along said paths; and
a plurality of tool supports movably mounted at said storage area, each of said supports being selectively movable between a retracted position within said storage magazine, and an extended position to bring a compartment into at least one of said paths to a transfer point for transfer of a tool between said tool transporting member and said compartment.

53. The improvement according to claim 52 further comprising;
means for selectively moving said tool handling member in a selected one of said paths; and
means for selectively stopping said tool handling member adjacent a selected one of tool storage compartments along said path.

54. The improvement according to claim 53 further comprising:
a carrier member movable along said paths;
said tool handling member being movable between said paths; and
said stopping means including a plurality of selectively actuatable stops to stop said tool handling member in a selected one of said paths, and effective to stop said carrier member at a selected one of said compartments along said selected path.

55. The improvement according to claim 52 wherein:
said compartments are arranged in rectangular array within said storage magazine, said paths correspond to different parallel rows of said array.

56. The improvement according to claim 53 wherein:
said compartments are arranged in rectangular array within said storage magazine, said paths correspond to different parallel rows of said array.

57. The improvement according to claim 54 wherein:
said compartments are arranged in rectangular array within said storage magazine, said paths correspond to different parallel rows of said array.

58. The improvement according in claim 57 wherein:
the compartments of each of the rows of said array which are perpendicular to said paths are movable together to bring each compartment of said row into a different one of said paths.

59. The improvement according to claim 52 wherein said tool handling member further comprises:
engaging means operable upon the movement of said tool handling member along one of said paths.

60. The improvement according to claim 52 further comprising:
engaging means carried by said supports for engaging the tool in response to a movement of said supports.

61. The improvement according to claim 59 further comprising:
engaging means carried by said supports for engaging a tool in response to the movement of said supports in a direction perpendicular to said paths.

62. The improvement according to claim 57 further comprising:
engaging means carried by said supports for engaging a tool in response to the movement of said supports in a direction perpendicular to said paths.

63. In a tool changer for use with a machine tool, wherein said machine tool includes a work support for supporting a workpiece, a machining support for supporting a tool in a machining operation upon said workpiece, and power drive means for imparting relative movement between said tool and said workpiece in a machining operation, and wherein said tool changer includes a tool storage magazine for storing a plurality of tools therein, and a tool carrier linearly movable in a straight line path of movement between said storage magazine and said machining support for transporting tools therebetween; and a pair of tool handling members linearly movable in a straight line path of movement upon said carrier and independently movable with respect to each other for engaging and supporting tools for movement with said carrier.

64. The improvement according to claim 63 wherein: one of said tool handling members carries tools exclusively from said storage magazine to said machining support and the other of said tool handling members carries tools exclusively from said machining support to said storage magazine.

65. The improvement according to claim 63 further comprising:

engaging means carried by said tool handling members and responsive to the movement of said tool handling member relative to a tool for engaging and disengaging said tool.

66. The improvement according to claim 64 further comprising:

engaging means carried by said tool handling members and responsive to the movement of said tool handling member relative to a tool for engaging and disengaging said tool.

67. The improvement according to claim 65 wherein: said tool tool engaging means is responsive to the movement of said carrier relative to a tool.

68. The claim according to claim 67 wherein: one of said tool handling members carries tools exclusively from said storage magazine to said machining support and the other of said tool handling members carries tools exclusively from said machining support to said storage magazine.

69. In a tool changer for use with a machine tool, wherein said machine tool includes a work support for supporting a workpiece, a machine head having rotatably mounted therein a spindle for supporting a tool in a machining operation upon said workpiece, and power drive means connected between said spindle and said machine head for rotating said spindle to move said tool in a machining operation upon said workpiece, and wherein said tool changer includes a tool storage magazine for storing a plurality of tools therein, and a tool transporting member movable between said storage magazine and said machine head for transporting tools therebetween;

the improvement comprising:

means carried by said transporting member for receiving a tool in a single predetermined orientation, retaining said received tool in said predetermined orientation while transporting said tool, and presenting said transported tool in said predetermined orientation;

means carried by said machine head for presenting to and receiving from said transporting member, a tool in said predetermined orientation, including means for stopping said spindle in a predetermined angular position; and means carried by said storage magazine for receiving a tool from said transporting member in said predetermined orientation, retaining said received tool in said predetermined orientation while storing said tool, and presenting said stored tool in said predetermined orientation to said transporting member.

70. The improvement according to claim 69 wherein: said tool changer employs exclusively rectalinear movements.

71. In a tool changer for use with a machine tool, wherein said machine tool includes a work support for supporting a workpiece, a machine head for supporting a tool in a machining operation upon said workpiece, and power drive means for imparting relative movement between said tool and said workpiece in a machining operation; and, wherein said tool changer includes a tool storage magazine for storing a plurality of tools therein with their axes parallel to the axis of the tool supported by said machine head;

the improvement comprising;

a tool transporting member relatively movable between a storage transfer region adjacent said storage magazine and a machine head transfer region adjacent said machine head, said member being movable in a plane perpendicular to the axis of a tool supported by said machine head to effect transfer of a tool between said two regions;

said member being relatively rectilinearly movable into and out of engagement with tools uported at both of said regions;

means for imparting relative rectilinear movement between said machine head and said member for relatively moving said machine head axially into and out of engagment in said plane, with a tool supported by said transporting member; and means for imparting rectilinear movement to said storage magazine for moving said storage magazie axially into and out of engagment in said plane, with a tool supported by said transporting member.

72. In a tool changer for use with a machine tool, wherein said machine tool includes a work support for supporting a workpiece, a machine head for supporting a tool in a machining operation upon said workpiece, and power drive means for imparting relative movement between said tool and said workpiece in a machining operation, and wherein said tool changer includes a tool storage magazine for storing a plurality of tools, therein;

the improvement comprising:

a tool transporting member relatively movable between a storage transfer region adjacent said storage magazine and a machine head transfer region adjacent said machine head, said member being movable in a plane perpendicular to the axis of a tool supported by said machine head, said member being movable in said plane to a plurality of tool transfer points distributed along both dimensions of said plane at at least one of said regions;

means for moving a tool axially and parallel to said axis between said plane and a storage area within said storage magazine; and means for transferring a tool between said machine head and said transporting member at said machine head transfer region.

* * * * *

UNITED STATES PATENT OFFICE
CERTIFICATE OF CORRECTION

Patent No. 3,780,423                    Dated December 25, 1973

Inventor(s) Alfred J. Lilienthal; Theodore F. Johnson; William
            E. Petri Jr.; Charles E. Gilbert, Jr.

It is certified that error appears in the above-identified patent and that said Letters Patent are hereby corrected as shown below:

Col. 2, l. 64, "chamber" should be --changer--.
Col. 3, l. 21, "Fig. 15" should be --Fig. 14--; l. 36 "theis" should be --this--.
Col. 10, l. 18 "merges" should be --emerges--.
Col. 16, l. 15 "255" should be --225--.
Col. 17, l. 25, "92" should be --91--.
Col. 23, l. 28, "A the carriage" should be --As the carriage--.
Col. 24, l. 43, "tool 4" should be --tool 44--; l. 44, "14.44" should be --14--.
Col. 25, l. 7, "28" should be --29--; l. 19, "28" should be --29--.
Col. 26, l. 28, "operable" should be --operably--.
Col. 29, l. 4, Claim 20, "claim 18" should be --claim 19--.

Signed and sealed this 13th day of August 1974.

(SEAL)
Attest:

McCOY M. GIBSON, JR.                C. MARSHALL DANN
Attesting Officer                   Commissioner of Patents